United States Patent
Yan et al.

[11] Patent Number: 6,003,065
[45] Date of Patent: Dec. 14, 1999

[54] METHOD AND SYSTEM FOR DISTRIBUTED PROCESSING OF APPLICATIONS ON HOST AND PERIPHERAL DEVICES

[75] Inventors: Albert Yan, Fremont; Jici Gao, Sunnyvale; Gerald Pelissier, Santa Clara, all of Calif.

[73] Assignee: Sun Microsystems, Inc., Palo Alto, Calif.

[21] Appl. No.: 08/845,564

[22] Filed: Apr. 24, 1997

[51] Int. Cl.[6] .............................. G06F 13/00; G06F 15/16
[52] U.S. Cl. ..................... 709/201; 709/200; 709/208; 709/219
[58] Field of Search ................ 395/200.31–200.33, 395/200.49, 200.55–200.59, 828, 835, 882–884; 709/200–203, 208, 219, 226–229

[56] References Cited

U.S. PATENT DOCUMENTS

| | | | |
|---|---|---|---|
| 5,109,486 | 4/1992 | Seymour | 395/200.54 |
| 5,375,207 | 12/1994 | Blakely et al. | 395/200.33 |
| 5,555,374 | 9/1996 | Armerding et al. | 395/822 |
| 5,590,288 | 12/1996 | Castor et al. | 395/200.31 |
| 5,802,290 | 9/1998 | Casselman | 395/200.31 |
| 5,850,573 | 12/1998 | Wada | 395/882 |

*Primary Examiner*—Zarni Maung
*Assistant Examiner*—Bharat Barot

[57] ABSTRACT

According to principles of the invention, a distributed data processing system having a host computer coupled by way of a network to one or more peripheral devices is presented. In part, this distributed data processing system has advantages over current technologies because executables run on a host device can also be downloaded and executed on a target peripheral device. The virtual machine instruction processor located in the host machine and the peripheral device run the same instruction set and therefore readily share executables. This capability opens up robust communication between the peripheral device and the host machine and sophisticated peripheral device management and administration.

18 Claims, 4 Drawing Sheets

METHOD AND SYSTEM FOR DISTRIBUTED PROCESSING OF APPLICATIONS ON HOST AND PERIPHERAL DEVICES

FIELD OF THE INVENTION

The present invention relates generally to peripheral device architecture and, more specifically, to a method and system for the distributed execution of applications among host computer systems and peripheral devices.

REFERENCE TO APPENDIX I

A portion of the disclosure of this patent document including Appendix I, The JAVA[1] Virtual Machine Specification and Appendix I thereto, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

1. JAVA, PicoJAVA, UltraJAVA, HotJAVA, The Network Is the Computer, Sun, the Sun logo, Sun Microsystems, Solaris, and Ultra are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd.

BACKGROUND OF THE INVENTION

Network computing has grown at a phenomenal rate over the last decade. In a network computing environment, a user has access to the computing power of multiple computers located on a network. Sun Microsystems Inc., a leader in network computing has even gone as far as developing a marketing campaign around the slogan "The Network Is the Computer"™ to emphasize the commercial success of this growing segment of the computing market. Recently, this slogan has become reality as millions of users have tapped the computing resources available from the thousands of computers on private intranets, the Internet and the World Wide Web.

Many individuals and organizations in the computer and communications industries tout the Internet as the fastest growing market on the planet. In the 1990s, the number of users of the Internet appears to be growing exponentially with no end in sight. In June of 1995, an estimated 6,642,000 hosts were connected to the Internet; this represented an increase from an estimated 4,852,000 hosts in January, 1995. The number of hosts appears to be growing at around 75% per year. Among the hosts, there were approximately 120,000 networks and over 27,000 web servers. The number of web servers appears to be approximately doubling every 53 days.

In July 1995, with over 1,000,000 active Internet users, over 12,505 usenet news groups, and over 10,000,000 usenet readers, the Internet appears to be destined to explode into a very large market for a wide variety of information and multimedia services.

In addition, to the public carrier network or Internet, many corporations and other businesses are shifting their internal information systems onto an intranet as a way of more effectively sharing information within a corporate or private network. The basic infrastructure for an intranet is an internal network connecting servers and desktops, which may or may not be connected to the Internet through a firewall. These intranets provide services to desktops via standard open network protocols which are well established in the industry. Intranets provide many benefits to the enterprises which employ them, such as simplified internal information management and improved internal communication using the browser paradigm. Integrating Internet technologies with a company's enterprise infrastructure and legacy systems also leverages existing technology investment for the party employing an intranet. As discussed above, intranets and the Internet are closely related, with intranets being used for internal and secure communications within the business and the Internet being used for external transactions between the business and the outside world. For the purposes of this document, the term "network" includes both the Internet and intranets. However, the distinction between the Internet and an intranet should be borne in mind where applicable.

In 1990, programmers at Sun Microsystems wrote a universal programming language. This language was eventually named the JAVA programming language. (JAVA is a trademark of Sun Microsystems of Mountain View, Calif.) The JAVA programming language resulted from programming efforts which initially were intended to be coded in the C++ programming language; therefore, the JAVA programming language has many commonalities with the C++ programming language. However, the JAVA programming language is a simple, object-oriented, distributed, interpreted, yet high performance, robust, yet safe, secure, dynamic, architecture neutral, portable, and multi-threaded language.

The JAVA programming language has emerged as the programming language of choice for the Internet as many large hardware and software companies have licensed it from Sun Microsystems. The JAVA programming language and environment is designed to solve a number of problems in modem programming practice. The JAVA programming language omits many rarely used, poorly understood, and confusing features of the C++ programming language. These omitted features primarily consist of operator overloading, multiple inheritance, and extensive automatic coercions. The JAVA programming language includes automatic garbage collection that simplifies the task of programming because it is no longer necessary to allocate and free memory as in the C++ programming language. The JAVA programming language restricts the use of pointers as defined in the C++ programming language, and instead has true arrays in which array bounds are explicitly checked, thereby eliminating vulnerability to many viruses and nasty bugs. The JAVA programming language includes objective-C interfaces and specific exception handlers.

The JAVA programming language has an extensive library of routines for coping easily with TCP/IP protocol (Transmission Control Protocol based on Internet protocol), HTTP (Hypertext Transfer Protocol) and FTP (File Transfer Protocol). The JAVA programming language is intended to be used in networked/distributed environments. The JAVA programming language enabled the construction of virus-free, tamper-free systems. The authentication techniques are based on public-key encryption.

These networked/distributed applications written in "write once run everywhere" programming languages such as JAVA need peripheral devices which operate under the same paradigm. Applications executed in a networked/distributed environment should also be able to interface with a wide variety of peripheral devices in an orthogonal and simple to use fashion. For example, users should be able to execute different application programs on multiple heterogeneous platforms and then print output from these applications on a variety of printer devices without concern over: device drivers; printer capabilities; or executing preprocessing data conversion routines.

Further, networked peripheral devices should be just as available for distributed processing as networked computers. For example, if a printer is attached to an intranet or the Internet, a user should be able to print a job remotely from work or home as long as a communication signal can be established between the user's remote computing device and the printer device. Likewise, the user should be able to execute applications and access other peripheral devices such as digital image capture devices, telecommunication devices, display devices, or even a sound generation device in a similar fashion. Essentially, the user should be able to use a peripheral device based on the needs of an application and not the availability of a particular device driver. For example, a desktop publishing application should be able to take pictures from different digital cameras located all over the world. If these digital cameras are coupled to the users computer over a network, the user should be able to select the camera which has a desired image and not be limited to the cameras compatible with his or her particular hardware platform. Essentially, a remote user should have the same amount of control over the camera's operation as a user would holding the camera. The user should then be able to display this image on a screen, print the image out on a printer, or deliver the image to a host computer. The image should even be compatible with devices such as a facsimile machine or digital based television such as HDTV (high definition television).

Moreover, peripheral device manufacturers and application developers should be able to develop products which work together for several types of peripheral devices and a wide range of operating environments. The peripheral device manufacturer should provide a predetermined set of functionalities capable of accessing the various features of the particular peripheral device. These finctionalities should be robust and easy to use so that people can rely on the technology for a long period of time. On the application development side, software developers should be able to make abstract calls to certain predetermined function calls without concern for the actual peculiarities of the underlying peripheral device. For example, a single printer management application should be able to manage and configure a wide range of printers, from a number of different manufacturers using a single GUI (graphical user interface) application. This would enable a user to select the printer device best suited for the print job rather than the printer compatible with the loaded device drivers.

Unfortunately, at present users do not have the luxury of using a peripheral device on a network unless their computer has the device driver required by the specific application and peripheral device combinations because the existing systems use a device driver to convert information generated by the application into a format a peripheral device can use. Typically, the driver receives data from the application, formats the data in a manner acceptable to the peripheral device, sends the data over the appropriate communication channel, and then provides the user with status of the job. Developing device drivers is complex because the peripheral device and the particular application are typically not developed using a standard interface. The device driver must be written to conform to the hardware specifications of the peripheral device. For example, obtaining status on a printer requires that the driver must interpret low level signals sent over the hardware interface. If the hardware is modified or changes, the device driver must also be modified accordingly.

It follows that developing device drivers or upgrades to the device drivers is an expensive and challenging project for most peripheral device manufacturers. In some cases, developing the device drivers can be a more daunting task than developing the peripheral device itself. For example, the peripheral device manufacturer must develop a different device driver for each different application, hardware platform, operating system, and sometimes also for each of the different versions associated with these different categories. This takes a significant amount of research and development. Later, the peripheral device manufacturer must support each driver released and provide updates to the drivers as problems are fixed.

In many ways, the success of a peripheral device can depend a great deal on the quality of the device drivers. A serious mistake or flaw in a device driver developed for a new operating environment or application can often cause the peripheral device to fail or produce less than optimal results. This results in wide spread customer dissatisfaction with a peripheral device even though the device is capable of producing higher quality results or output. For example, a printer capable of high resolution printing such as 1200 dpi may work suboptimal with an old or defective driver by falling back to a lower resolution such as 300 dpi. A user may return the printer because of the apparent defect or low quality even though the problem is with the driver and not the printer.

Setting up and administering peripheral devices is also difficult in a heterogeneous environment since so many devices have different capabilities and diagnostic conditions. In many cases, each different peripheral device comes with stand-alone diagnostic application and drivers which must be installed on each machine that interacts with the device. These various diagnostic tools are typically proprietary and communicate with each peripheral device based on proprietary predetermined hardware signals. The interpretation of these signals is left up to logic contained within each diagnostic software application and varies from device to device. For example, a hardware signal generated from one printer device may indicate that the printer is "out of paper" while the same signal transmitted to a second printer device may cause the printer and host computer to crash or "lock-up". Accordingly, the proprietary nature of current peripheral device architecture designs makes it infeasible to use a single application to manage a large heterogeneous collection of peripheral devices.

Several companies have attempted to solve incompatibilities between peripheral devices by creating several different page description layout (PDL) languages. Unfortunately, PDL languages do not properly address all the shortfalls associated with controlling peripheral devices. Even though, these page description languages organize the layout of page information in a programmatic manner they do not allow general purpose processing. For example, PostScript, PCL, Adobe Acrobat, Adobe PrintGear, Microsoft Graphics Device Interface, and Apple QuickDraw are all different PDL language variations which describe how data should be placed on the page but do not enable the printer to perform general purpose operations. Further, existing PDL languages are generally too complex and limited to develop important applications such as conversion routines to convert between different image formats such as between TIFF, GIF, and JPEG. Essentially, these PDL languages only simplify the portion of printing which deals with page layout on a printer but do not simplify all the problems associated with peripheral device compatibility.

PDL languages are also unsuccessful in increasing peripheral device compatibility because no particular PDL language has been widely accepted. This has caused the peripheral market to become fragmented among different standards such as PCL (printer control language) and PostScript. Ironically, this has caused device driver development to become even more complex as the peripheral device manufacturers and users must deal with more, not less, device drivers and options. Under the current technology, this means that users can be required to load more device drivers in order to match the personality of the printer (e.g. PostScript, PCL) and the application being used.

Accordingly, the various PDL languages being used have actually made peripheral device control and management more complex.

What is needed is a peripheral device architecture which integrates software applications with the peripheral device hardware in a uniform manner. Applications written to work with one brand and make of peripheral device should also be able to function with another brand and make of a peripheral device without loading new drivers, new software, or new versions. Users should be able to use a wide range of peripheral devices and distribute processing over an intranet or the Internet to the peripheral devices most appropriate for the application. Further, status and diagnostics should be readily available on a single application from a wide range of peripheral devices.

SUMMARY OF THE INVENTION

According to principles of the invention, a distributed data processing system having a host computer coupled by way of a network to one or more peripheral devices is presented. In part, this distributed data processing system has advantages over current technologies because executables running on a host device can also be downloaded and executed on a target peripheral device. A virtual machine instruction processor located in the host machine and the peripheral device run the same instruction set and therefore facilitate the sharing of executables. This capability opens up robust communication between the peripheral device and the host machine and sophisticated peripheral device management and administration. Of course, in a large business organization this also results in lower total cost of operation and ownership because peripheral devices can be managed more easily and more efficiently. Essentially people can be use peripheral devices more easily than before and be more productive as a result. In view of these characteristics, a distributed data processing system based on peripheral devices with embedded virtual machine instruction processors presents attractive price for performance characteristics, if not the best overall performance, as compared with current peripheral architecture solutions.

In one embodiment of the invention, the distributed data processing system includes a peripheral database, a number of host computers each including a first virtual machine instruction processor capable of executing one or more virtual machine instructions, and a number of peripheral devices each having a second virtual machine instruction processor capable of executing one or more virtual machine instructions. The host computers and the peripheral devices are typically coupled together by a communications network. In this embodiment, the peripheral database is coupled to the network and contains information concerning the capabilities for each of the peripheral devices coupled to the network. In addition to the first virtual machine processor, the host computer also generally includes a first network interface coupled to the network suitable for bi-directional transmission of data from the host computer to the network. Typically, bi-direction transmission of data includes status information on the host computer and the peripheral device on the network. A storage device coupled to the host computer is generally used to store an application which requires use of a peripheral device and is composed of one or more virtual machine instructions. The system also includes a determination mechanism typically embedded in the application which queries the peripheral database based upon a predetermined criteria and selects which peripheral device should execute the application. Once the determination mechanism embedded in the application selects the proper peripheral device, a download mechanism, also coupled to the first network interface, transfers data and, optionally, a portion of the application to the selected peripheral devices for execution. In an alternative embodiment, the download mechanism only downloads data into the selected peripheral device whereupon an existing application in the selected peripheral device operates on the data.

Another embodiment of the invention provides a method for using the distributed data processing system above to distribute the processing of an application between a host computer and one or more peripheral devices coupled to a network. Initially, the method collects information concerning the capabilities for each of the one or more peripheral devices coupled to the network. This information can be stored in a single area on the network, such as a database, or may be distributed in several areas on the network such as in each peripheral device. Next, the method executes an application composed of one or more virtual instructions on a host computer having a virtual machine instruction processor. The application typically has a predetermined criteria for one or more peripheral devices. This predetermined criteria is then used by the method to query the information collected concerning the capabilities for each of the one or more peripheral devices. The query results are then used to select which peripheral device should execute the application. In one embodiment, the method then transfers data and at least a portion of the application to the selected peripheral device. Typically, this application then executes on the selected peripheral device using the transferred data. Further, a bidirectional communication between the selected peripheral device and the host computer is established. This bidirectional communication facilitates the transmitting and receiving of information associated with the selected peripheral device and the host computer. This information can be useful in obtaining additional status or control over the peripheral device and the host computer.

DETAILED DESCRIPTION

Environment/Preconditions

Figure 1:
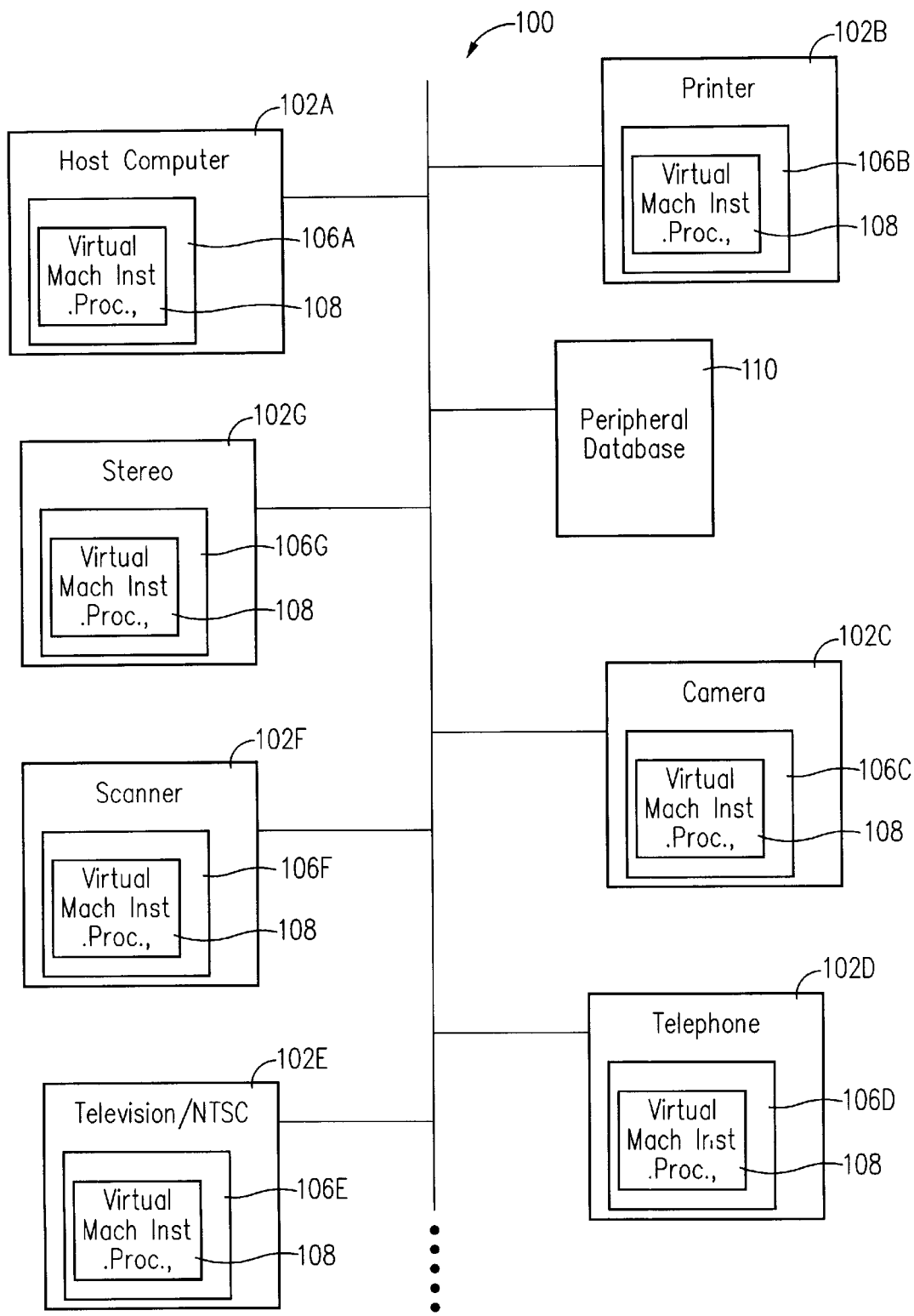
FIG. 1 illustrates a computer network for practicing one embodiment of the present invention.

FIG. 1 illustrates a computer network 100 for practicing one embodiment of the present invention. Computer network 100 includes at least one host computer system such as a host computer 102A coupled to one or more peripheral devices such as a printer 102B, an image capture device such as a camera 102C, a telecommunication device such as a telephone 102D, an image display device such as an HDTV television 102E, an image input device such as a scanner 102F, and a sound generator device such as a stereo 102G. In addition, computer network 100 includes a peripheral database 110 for storing a profile of the capabilities for each of the one or more peripheral devices coupled to the network. In a typical implementation, host computer 102A and the one or more peripheral devices 102B–102G are capable of unicast (i.e. point-to-point) or multicast communications over the network using a common network communication mechanism such as the TCP/IP protocol running under an operating system such as JAVA/OS, Apple Macintosh Operating System, OS/9, OS/2, UNIX, MVS, VM, DOS, or even a Microsoft Windows based operating system. As will be apparent from the discussion below, having a virtual machine instruction processor embedded in a peripheral device is one novel aspect of the present invention which facilitates distributed processing on many peripheral devices in a heterogeneous computing environment.

In accordance with the principles of the present invention, host computer 102A and peripheral devices 102B–102G include a processing unit 106A–106G respectively. Typically, each processing unit 106A–106G implements a virtual machine instruction processor 108 for processing virtual machine instructions. For clarity, other elements in processing unit 106A–106G discussed below and illustrated in FIG. 2 have been omitted in FIG. 1.

It should be understood that virtual machine instruction processor 108 need not be identical in each processing unit 106A–106G as long the instructions executed on each virtual machine instruction processor are compatible based on a virtual machine instruction specification such as the "JAVA Virtual Machine Specification" included in Appendix I. In one embodiment, all instructions executed on host computer 102A and peripheral devices 102B–102G are executed on one or more virtual machine instruction processors 108. Thus, on this type of system the operating system and the applications include virtual machine instructions rather than proprietary or native processor instructions. Alternatively, in another embodiment, one or more virtual machine instruction processors 108 can be used as co-processors in conjunction with proprietary instruction processors such the Intel Pentium and x86 processors, the Sun SPARC and UltraSPARC processors, Motorola 68000, and PowerPC processors where virtual machine instruction processor 108 executes portions of the applications and operating system which use virtual machine instructions and the proprietary instruction processor executes the remainder of instructions not using virtual machine instructions.

In general, the combination of a virtual machine instruction processor embedded in a peripheral device facilitates a level of distributed computing between peripheral devices and host computers which was previously unavailable in the art. This novel design enables the sharing of resources and the distribution of processing not only between two host computers coupled to a network but between peripheral devices and host computers as well. To illustrate some of these efficiencies and benefits, a more detailed discussion below provides one method for distributing the processing of an application between a host computer and one or more peripheral devices.

Figure 2:
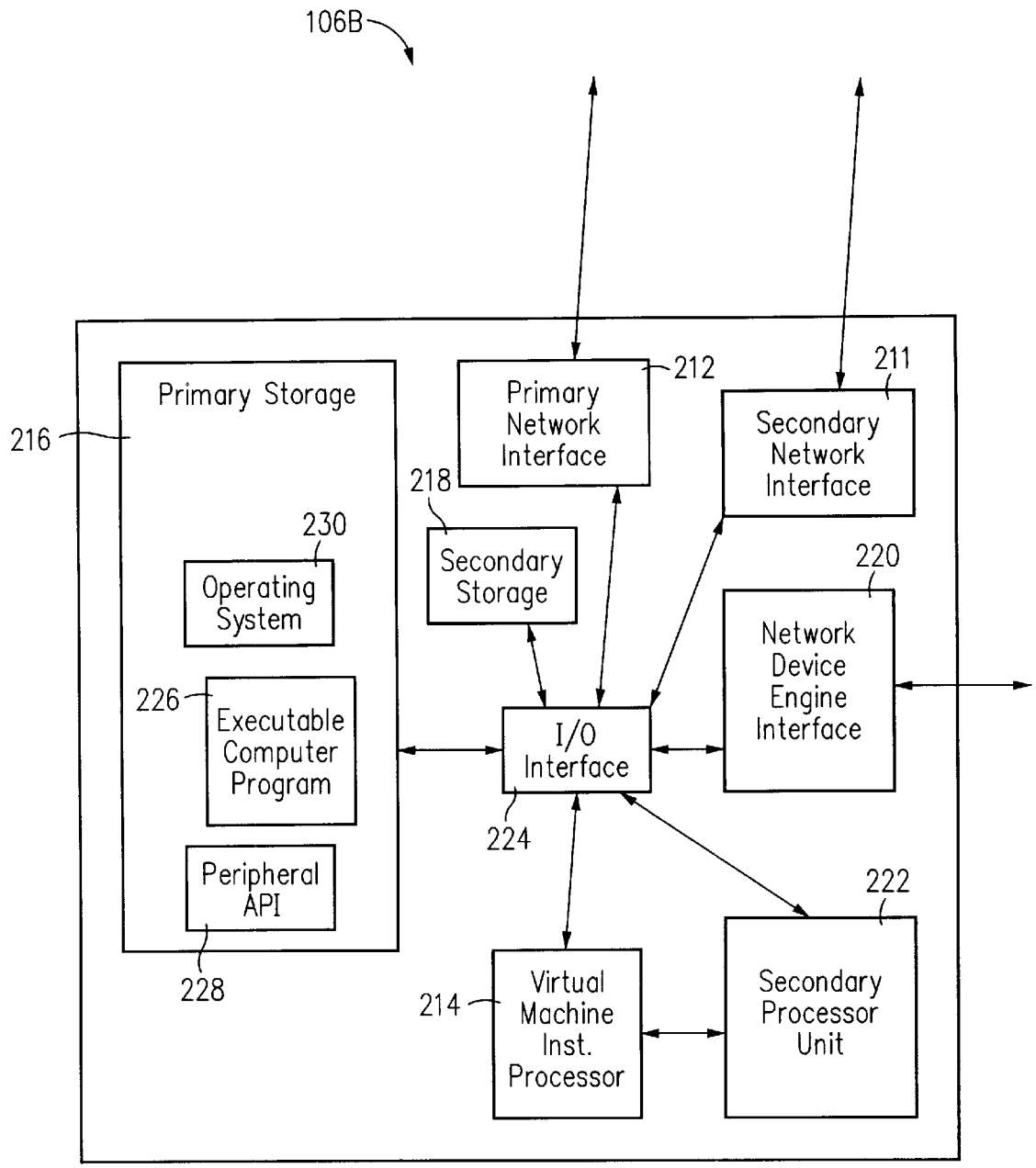
FIG. 2 is block diagram illustrating further details of a processing unit used in a peripheral device such as a printer.

Referring to FIG. 2, a block diagram illustrates further details for processing unit 106B as used in a peripheral device such as printer 102B (FIG. 1) coupled to computer network 100. Processing unit 106B in FIG. 2 includes a primary network interface 212, a secondary network interface 211, a virtual machine instruction processor 214, a primary storage 216, a secondary storage 218, a peripheral engine interface 220, a proprietary processor unit 222 and an input-output interface 224 which facilitates communication between these aforementioned elements. In this context, peripheral engine interface 220 couples processing units such as processing unit 106B to a core engine central to the functioning of the peripheral device. For example, the core engine in a printer is considered a print engine while the core engine in a television could be the CRT (cathode ray tube) and all the supporting circuitry needed to generate an image on the CRT. Details on the specific core engine used to operate each peripheral device is not essential to embodiments of the present invention and is beyond the scope of the present discussion.

Primary network interface 212 is typically used to couple processing unit 106B (FIG. 2) to network 100 (FIG. 1) and facilitate communication between a peripheral device such as printer 102B (FIG. 1) and other peripheral devices or host computers on network 100 (FIG. 1). Optionally, a secondary network interface 211 couples processing unit 106B (FIG. 2) to a second network (not shown) and facilitates communication between the particular peripheral device and other peripheral devices or host computers coupled to a second network (not shown). Those skilled in the art will understand that primary network interface 212 or secondary network interface 211 can also be coupled to a router device (not shown) or switch device (not shown) in which case the corresponding peripheral device can communicate with a multitude of networks, host computers, and other peripheral devices. Further, those skilled in the art will appreciate that primary network interface 212 and secondary network interface 211 can include both serial and parallel technologies typically used to couple peripheral devices to networks including Ethernet, X.25, SCSI (small computer systems interface), SDLC, HDLC, IEEE 1394 ("FireWire"), IEEE 1284 (Enhanced Communication Port—ECP), and other high speed low-latency communication technologies. Selecting the appropriate communication link will depend on the price-performance required as well as compatibility requirements for the overall design.

In operation, virtual machine instruction processor 214 in FIG. 2 is used in a peripheral device such as printer 102B (FIG. 1) to fetch virtual machine instructions from primary storage 216 through input-output interface 224. After retrieving the virtual machine instructions, virtual machine instruction processor 214 then executes the instructions. Executing these computer instructions enables virtual machine instruction processor 214 to retrieve data or write data to primary storage 216, display information on one or more computer display devices (not shown), receive command signals from one or more input devices (not shown), or transmit the appropriate signals through peripheral engine interface 220 causing a peripheral device to operate. These virtual machine instructions can also retrieve data or write data to secondary storage 218, host computer 102A (FIG. 1), or other peripheral devices coupled to network 100 (FIG. 1). Those skilled in the art will understand that primary storage 216 and secondary storage 218 can include any type of computer storage including, without limitation, randomly accessible memory (RAM), read-only-memory (ROM), application specific integrated circuits (ASIC) and storage devices which include magnetic and optical storage media such as CD-ROM. Preferably, virtual machine instruction processor 214 implements the JAVA virtual machine as specified in the "Java Virtual Machine Specification" in Appendix I. In one embodiment, virtual machine instruction processor 214 includes any of the JAVA based processors developed and marketed by Sun Microsystems, Inc. or JAVA compatible processors developed by other companies. For information on virtual machine instruction processors see U.S. patent application Ser. No. 08/788,807, entitled "A HARDWARE VIRTUAL MACHINE INSTRUCTION PROCESSOR" naming Marc Tremblay and James Michael O'Connor as inventors, assigned to the assignee of this application, and filed on Jan. 23, 1997 with Attorney Docket No. P2044, still pending which is incorporated herein by reference in its entirety. Virtual machine instruction processor 214 can also be any of the SPARC or UltraSPARC compatible processors also available from Sun Microsystems, Inc. of Mountain View, California and other companies. Alternatively, virtual machine instruction processor 214 can be based on the PowerPC processor available from Motorola of Schaumburg, Ill., any of the Pentium or x86 compatible processors available from the Intel Corporation or other corporations such as AMD, and Cyrix, or any other proprietary processor capable of executing virtual machine instructions.

Optionally, proprietary processor 222 can be used in conjunction with virtual machine instruction processor 214 as a coprocessor for certain specialized compute intensive virtual machine instructions relating to areas such as graphics, floating point, and digital signal processing. Proprietary processor 222 can also be used as a secondary processor for running instructions which are not virtual machine instructions. In this latter capacity, proprietary processor 222 can be used to execute local processing peculiar to the local peripheral device and not suitable for distributing for execution to other host computers or peripheral devices coupled to the network. This can include the execution of memory management units, multitasking queueing operations, or any other operations typically associated with a runtime environment, an operating system, or more specifically, a kernel. For example, if proprietary processor is assisting virtual machine instruction processor 214 as a coprocessor, instructions can flow directly from virtual machine instruction processor 214 and if proprietary processor 222 is not directly assisting virtual machine instruction processor 214, then proprietary processor 222 can act as a secondary processor wherein instructions can flow from primary storage 216 via input-output interface 224.

Referring to FIG. 2, primary storage 216 includes a peripheral API 228 (application programming interface), an executable computer program 226, and optionally an operating system 230 for managing resources on the peripheral device or host computer. In one embodiment, peripheral API 228 utilizes an object-oriented, highly extensible programming language called JAVA which is developed and marketed by Sun Microsystems Inc. This peripheral API enables executable computer programs 226 to access functionality associated with a peripheral device such as printer 102B using hardware independent and architecturally neutral system calls. These system calls correspond to specific virtual machine instructions which execute on virtual machine instruction processor 214 in the form of bytecodes and cause the peripheral device to operate in a specified manner. This is one important aspect of the present invention which provides features and capabilities previously unavailable in the art.

Using peripheral API 228, an application can request functionality from a peripheral device without knowing the specifics of how the particular device operates. Essentially, the peripheral device invokes certain predetermined system calls in peripheral API 228 which in turn invokes virtual machine instructions on the virtual machine instruction processor and causes the peripheral device to operate. This benefits application developers because a single application using peripheral API 228 can run on a variety of different devices without recompiling or including special drivers or libraries. It also benefits users because they can use many devices on the network without reloading or reconfiguring their systems. Further, this also benefits the peripheral device manufacturers because the peripheral device becomes compatible with a larger number of applications. Each time a new peripheral device is developed the manufacturer need only port peripheral API 228, written in JAVA, to the to the particular peripheral device. This obviates the need to support different device drivers for each application and/or operating system combination. Further details on peripheral API 228 are discussed below.

Depending on the resources and complexity of the peripheral device, operating system 230 can be relatively simple or very complex. Typically, operating system 230 includes networking protocol stacks such as TCP/IP, X.25, SNA, or portions of network operating systems such as NetWare®[1] for controlling the transmission and receipt of data and executable programs over the network. Operation system 230 can also be responsible for swapping executable computer program 226 in primary storage 216 or secondary storage 218 for execution by virtual machine instruction processor 214. Accordingly, in one embodiment, operating system 230 is the JAVA OS operating system which can be executed on virtual machine instruction processor 214 and processes JAVA language instructions most efficiently. Alternatively, operating system 230 can include the Solaris operating system, the Internetworking Operating System (IOS) used in CISCO router devices, DOS, Windows NT, Windows 95, or any other operating system capable of managing resources and processing requests associated with a particular peripheral device or host computer.

[1]. NetWare is a registered trademark of Novell, Inc. in the United States and other countries.

In general, those skilled in the art will understand that the principles discussed above and associated with processing unit 106B (FIG. 1) as used in a printer 102B can also be applied to other peripheral devices such as peripheral devices 102C–102F as well as any other peripheral device used in a distributed computing environment.

A. Peripheral API

In accordance with the present invention, peripheral API 228 (FIG. 2) is used by executable computer program 226 as an interface to virtual machine instruction processor 214 which then drives a peripheral device such as peripheral devices 102C–102G (FIG. 1) discussed above. These APIs take advantage of the fact that applications typically perform the same imaging and multimedia operations over a wide range of peripheral devices. For example, an application which prints to a printer may also want to print to a FAX device or to multiple display screens located in different geographic locations.

Using a virtual machine instruction set to implement peripheral API 228 provides additional benefits because the same code can be executed on many different peripheral devices without recompilation. For example, applications which make calls to peripheral API 228 using JAVA can interface with different peripheral devices because the processor is either a JAVA processor or implements the JAVA virtual machine. To drive a peripheral device, the application need only download the application or applet into the virtual machine instruction processor located on the peripheral device.

The virtual machine instructions used to implement peripheral API 228 are also beneficial because processing of the jobs can be distributed or relocated on different host computers or peripheral devices. For example, using peripheral API 228 described below enables a first peripheral device to request a second peripheral device (not shown) to process data and return the image for further processing on the first peripheral device. Therefore, well written applications can perform peripheral operations in parallel and improve the effective performance of a given peripheral device.

An exemplary embodiment of peripheral API 228 has been provided below which is well suited for printer devices and digital camera devices. In this embodiment, peripheral API 228 includes the following categories: 1) text handling; 2) font handling; 3) image processing; 4) 2d & 3d graphics processing; 5) color processing; 6) matrix handling; 7) device handling; 8) connection handling; 9) administration; 10) job handling; and 11) connectivity with other digital devices. Those skilled in the art will understand that these general concepts and techniques are not limited solely to printer devices and the like and can be used directly or indirectly to develop peripheral APIs for devices not explicitly mentioned herein.

Text handling and Font handling

In most peripheral devices, a significant portion of the information being input, output, or manipulated by the peripheral device is text. This category of routines deals with the manipulation of text by changing the size of the text, the style of the text, and also allows for operations on the rotation of the text using a TextMatrix( ) routine. For example, an application which wants to change the text font to italic on a printer device will call the TextStyle( ) routine with a "Italic" argument in the parameter list. This instruction will be executed by the virtual machine processor in the peripheral device which will cause the correct font to be downloaded over the network or off a local storage device and used for printing.

The FontLocation(fontID) and FontLoad(virtual_location) are particularly interesting system calls because they enable an application to direct the printer to download a font from a remote location rather than downloading the font directly from the host computer running the application. These functions can result in significant cost and time savings. For example, a host computer printing a job can download into the printer the URL location of a particular font located on the World Wide Web which is to be used in a given document. This saves storage space because only a few central repositories of fonts need be located on a given network and actual font data is not replicated on each host system in a network. Instead, each reference to a given font is downloaded from a server containing hundreds and thousands of fonts. The user experiences improved performance because fonts are downloaded by the peripheral device and not the host computer.

Another interesting system call is ReadThirdPartyFont(fontID) which allows the peripheral device to process fonts provided by a third party vendor and not supported in the native peripheral API. For example, a font designer using PCL fonts may provide an applet which processes PCL fonts for use in a particular application. This applet would be downloaded into the peripheral device from an appropriate place on the network when the application requires PCL fonts. This system call provides flexibility in which fonts are used by a peripheral device and allows the personality of the peripheral device to be configured dynamically.

In one embodiment, the following API routines can be used to manipulate text on a peripheral device.

1) Text Handling
   1.1) Text Matrix Selection
      1.1.1) TextSize(x,y)
      1.1.2) TextStyle(type)
      1.1.3) TextMatrix(matrix)
   1.2) text positioning
      1.2.1) TextMove(x,y)
   1.3) text output
      1.3.1) Textoutput(string)
2) Font Handling
   2.1)Type 1
      3.1.1) ReadType1Font(fontID)
   2.2) TrueType
      3.2.1) ReadTrueTypeFont(fontID)
   2.3) font location
      3.3.1) FontLocation(fontID)
   2.4) font selection
      3.4.1) FontSelect(fontID)
      3.4.2) FontPurge(fontID)
   2.5) font download from URL/Server
      3.5.1) FontQuerv(fontID)
      Query font with server if none is in printer
      3.5.2) FontLoad(virtual location)
   2.6) Third-party font process
      3.5.1) ReadThirdPartyFont(fontID)
      NOTE: this will be substituted by third party vendor Image Processing The other information typically processed by a peripheral device displaying or processing visual information is images. These images are typically digitized into pixels and when displayed have different colors, textures, and other visual features. Often, they come in many compression and encoding formats such as GIF, TIFF,JPEG, HTML, or Adobe Acrobat. In one embodiment, several system calls allow the peripheral device to convert between these different compression and encoding formats. The user can also request that the peripheral device add certain background patterns to the image generated by a peripheral device using the Pattern Selection system calls. Further, the user can also request the peripheral device to perform sophisticated image manipulation using the Image Operation set of system calls. The user can even request a peripheral device such as a digital camera only detect certain objects by using sophisticated image analysis routines as described in the Image Analysis and Recognition system calls. In general, this set of APIs enables a user to perform intense image processing routines on a remote peripheral device and off-load processing on the host computer. Accordingly, in one embodiment, the following routines could be used to perform various image processing tasks.

3) Image Processing
   3.1) Pattern Selection
      3.1.1) PatternSelect(patternID)
      3.1.2) PatternLoad(patternID)
      3.1.3) PatternLocation(patternID)
      3.1.4) PatternPurge(patternID)
   3.2) Transparency mode
      3.2.1) SourceTransparancySelect( )
      3.2.2) PatternTransparancySelect( )
      3.2.3) CompositeSelect( )
   3.3) Image Operation
      3.3.1) ImageScale( )
      2.3.2) ImageRotate( )
      3.3.3) Imageoutput( )
      3.3.4) ImageTranslate( )
      3.3.5) Image Clipping( )
   3.4) Image Filtering
      3.4.1) JPEGFilter( )
      3.4.2) GIFFilter( )
      3.4.3) CCITTFilter( )
      3.4.4) LZWFilter( )
      3.4.5) RunLengthFilter( )
      3.4.6) TIFFFilter( )
      3.4.7) ThirdPartyFilter( )
   3.5) Image Anaylses & Recoginition
      3.5.1) ImageAnaylese( )
      3.5.2) ImageRecoginition( )
      3.5.3) ImageSharpen
      3.5.4) ImageEnhance( )
      3.5.5) ImageEdgeDetect( )
      3.5.6) ImageEmboss( )
      3.5.7) ImageConvert( )
   3.6) image block transfer (for fast image process)
      3.6.1) ImageBitBlt( )

2d & 3d graphics processing

With the increase in high-end simulations and games, most applications display images having 2-D and 3-D attributes. Often these routines are most difficult to implement because the human eye must be tricked into believing objects on a 2-D screen have 3-D attributes. This requires a great deal of control over the graphic processing routines.

Further, it would be advantageous if processing required by these routines are off-loaded to the peripheral device thus freeing up processing on the host computer. For example, users playing a virtual reality game on a system having numerous display terminals could download the graphical rendering routines into each display terminal thus distributing the 3-D graphics processing load from the host machine. Further, a user wishing to capture a particular scene during the virtual reality game could download the particular scene to a printer device having a virtual instruction processor which would then process the information and print out the 3-D scene as desired.

The 3D Graphics system calls are particularly interesting because they allow the peripheral device to perform a 2D to 3D conversion. In the past, the host computers converted 3D graphics into 2D images and transferred the resulting bit maps onto the peripheral devices such as a printer. Using 3D Graphics calls enables the host processor to request that the peripheral device perform these conversions instead. This allows the host processor to transfer 3D graphics to the printer directly without the 3D to 2D conversion.

In one embodiment, the following routines can be used to control 2D and 3D graphics: processing on peripheral devices:

4.1) line attribute
2d & 3d graphics processing
    4.1.1) LineWidth( )
    4.1.2) LineType( )
    4.1.3) LineEnds( )
    4.1.4) LineJoins( )
    4.1.5) LineMiterLimit( )
4.2) path operation
    4.2.1) BezierPath( )
    4.2.2) LinePath( )
    4.2.3) ArcPath( )
    4.2.4) RectanglePath
    4.2.5) ClosePath( )
    4.2.6) NewPath( )
    4.2.7) AddPath( )
4.3) clip operation
    4.3.1) ClipSelect
    4.3.2) SetClipPath
    4.3.3) ClipPath
    4.3.4) EOClipPath
4.4) filling and stroking
    4.4.1) FillPath
    4.4.2) StrokePath
    4.4.3) EOFillPath( )
    4.4.4) StrokeAdjust( )
    4.4.5) DrawLine
    4.4.6) DrawRect
    4.4.7) DrawCircle
    4.4.8) DrawArc
    4.4.9) FillRect
    4.4.10) FillCircle
    4.4.11) FillArc
4.5) 3D graphics
    4.5.1) GradientTypeSelect
    4.5.2) GradientFill
    4.5.3) TBD Color Processing Color processing is another important feature in peripheral devices because it directly affects the realism or aesthetic appeal of the output. Different color processing routines can render images more quickly than others and also have better resolution and visual acuity. Also, color matching heuristics are used to ensure the colors which appear on one peripheral device, such as a display terminal, closely match the same colors which appear on another peripheral device, such as a color printer. If these color processing applications are written in a virtual machine instruction language such as JAVA and used in embodiments of the present invention, many peripheral devices can take advantage of the available features.

The ThirdPartyColorManagementSelect system call is an interesting feature which enables a user or application to install different color management heuristics. This feature allows the user to select the color matching technique which works best for the particular peripheral device and image being rendered. This allows the user or application to take advantage of newer and improved color matching techniques as they are developed and improves on the prior art techniques where the color matching techniques were hardcoded into firmware of the peripheral device.

Accordingly, the following API is one embodiment for providing these functions to a color peripheral device.

5) color processing
    5.1) color setting
        5.1.1) CurrentColor
        5.1.2) SetColor
    5.2) color space
        5.2.1) ColorSpaceSelect
        5.2.2) ColorSpaceConversion
    5.3) color management
        5.3.2) ThirdPartyColorManagementSelect
        TBD
    5.4) screen selection
        5.4.1) DitherSelect
        5.4.2) HalftoneSelect
        TBD Matrix Operations Image processing and image enhancement is also another important area of peripheral device management and usage. These types of functions enable the user to manipulate the data using matrices and modify some characteristic of the appearance. The Global Matrix Settings set the default behavior for all pages, text, and images used on a particular peripheral device. In contrast, the Matrix Operations are used to perform individual operations on different pieces of image data. In some cases, the matrix may be used to create a special effect and make the end result look surrealistic or fabricated. In other cases, the matrices can be used to improve the accuracy of an image and make it look more real. Matrices can also be used to perform rotations of an image for printing an image in landscape mode as well as portrait mode. The following is one embodiment of the system calls and functions useful in matrix operations.

6.1) Global Matrix Settings
        6.1.1) SetPageMatrix
        6.1.2) SetTextMatrix
        6.1.3) SetImageMatrix
    6.2) Matrix Operations
        6.2.1) Transform( )
        6.2.2) InverseMatrix( )
        6.2.3) ConcatMatirx( )
        6.2.4) RotateMatrix( )
        6.2.5) ScaleMatrix( )
        6.2.6) TranslateMatrix( )

Device Handling

The Device Handling system calls provide a general interface for changing the operating characteristics of a peripheral device without knowing specific information about the device. In the past, a user or application could not modify the operation of a peripheral device without having special knowledge of the peripheral devices operation. Moreover, it was difficult to change the operation of a peripheral device between jobs. Accordingly, these APIs deal with configuring a peripheral device to operate in a specific manner and perform certain functions. The "Query" set of functions below allow the application running on the host computer to determine what the capabilities of the device are directly. This is then used to set the device accordingly. For example, the NUpQuery( ) system call can be used to determine how many pages the printer can print on single page. The result from this query helps the application provide the user with the appropriate type of options for printing.

The SendPage( ) and SendPageAddress( ) are particularly interesting system calls because they allow one peripheral device to distribute processing to one or more other peripheral devices. Essentially, the SendPage( ) system call instructs the peripheral device processing a request to send the output, typically a bit map, to another host as indicated by the SendPageAddress( ). This can be useful in providing peripheral device output previews such as printer preview actually calculated on the target peripheral device. If the peripheral device is an expensive color printer, this can save resources because the color printer will only generate a bit map and send the results back to a host processor for review by a user rather than actually printing the image.

7.1) duplex
   7.1.1) DuplexSelect( )
   7.1.2) DuplexQuery( )
   7.1.3) TumbleSelection( )
7.2) page size
   7.2.1) PageSelect( )
   7.2.2) PageQuery( )
7.3) n-up
   7.3.1) NUpSelect( )
   7.3.2) NUpQuery( )
7.4) orientation
   7.4.1) PageOrientation( )
   7.4.2) GlobalPageMatrix( )
7.5) staple
   7.5.1) StapleSelect
   7.5.2) StapleQuery( )
7.6) collateral
   7.6.1) CollateralSelect p2 7.6.2) CollateralQuery
7.7) binding
   7.7.1) BindingSelect
   7.7.2) BindingQuery
7.8) page-wise operations
   7.8.1) PageInvert( )
   7.8.2) PageRotate( )
   7.8.3) PageFlip( )
   7.8.4) PageTiling( )
   7.8.5) PageOutputFormat
   7.8.6) PrintPage( )
   7.8.7) ErasePage( )
   7.8.8) SendPage( )
   7.8.9) SendPageAddress( )
7.9) paper tray select
   7.9.1) TraySelect
   7.9.2) TrayQuery
   7.9.3) TrayStatusQuery
7.10) copy number
   7.10.1) SetCopyNumber( )

Connection Handling

Connection handling allows for the application to determine which protocols a peripheral supports and the type of communication the peripheral device uses to function. For example, the ProtocolSupport( ) system call can be used to determine whether the peripheral device supports TCP/IP communications.

8.1) status query
   8.1.1) ProtocolSupport( )
   8.1.2) IOSupport( )
8.2) network management
   8.2.1) NetworkSupport( )
   8.2.2) NameDirectoryServerAddress( )

Administration

Peripheral devices provide some of the most difficult tasks in managing a computer network. Many times printers will fail to work because a device driver attempting to change the personality or attributes of a printer fails and causes the printer to jam. In other instances, the user can not use a printer because the requested printer is out of paper and no one is aware of it. Embodiments of the present invention provide a method for peripheral devices to communicate status information to users, system administrators, and peripheral device management routines which facilitate effective peripheral device administration.

The Firm Ware Update system calls include several interesting routines which enable a peripheral device to obtain the latest firmware updates. In one embodiment, these routines cause the peripheral device to download the latest firmware updates at a predetermined time interval over a URL location on the World Wide Web. Alternatively, the manufacturer can "push" the firmware updated onto the peripheral device over the Internet or over an intranet when the firmware is released. Either model improves peripheral device administration by making sure the peripheral devices have the latest firmware upgrades.

9.1) setup
   9.1.1) DefaultServer( )
   9.1.2) GeographLocation( )
   9.1.3) SetupDate( )
   9.1.4) SysAdminAddress( )
   9.1.5) PrinterCapability( )
   9.1.6) PaperPrinted( )
   9.1.7) BootServerAddr( )
   9.1.3) SetupLog( )
9.2) registration
   9.2.1) Owner( )
   9.2.2) WhoAmI( )/PrinterName( )
   9.2.3) MyIpAddress( )
   9.2.4) MyEtherAddress( )
   9.2.5) MyFileServerAddress( )
   9.2.6) MyWebURL( )
   9.2.7) RegisterationLog( )
9.3) firmware update
   9.3.1) FirewareVersion
   9.3.2) LatestUpdateDate
   9.3.3) FirmwareSourceURL( )
   9.3.4) UpdateNow( )
   9.3.5) UpdateOnDate( )
   9.3.6) UpdateLog( )
9.4) supports
   9.4.1) HardwareSupportAddr
   9.4.2) SoftwareSupportAddr
   9.4.3) ServiceSupportAddr
   9.4.4) SupplySupportAddr
      9.4.4.1) TonerSupplyAddr( )
      9.4.4.2) PaperSupplyAddr( )
   9.4.5) SupportLog( )
9.5) security
   9.5.1) SysAdminPassword
   9.5.2) ServicePassword
   9.5.3) LoginSessionLog( )
   9.5.4) Signature( )

Job Handling

Job handling system calls include routines which allow the peripheral devices to manage their jobs and decide how the jobs should be processed. These routines off-load some of the processing associated with queueing jobs on the host machine and allows the host to process other more imminent tasks such as running an application. Instead, these routines enable each individual peripheral device to manage their own queue and request a new job when the peripheral device becomes available. Essentially, peripheral devices can operate autonomously instead of relying on a queue on the host device. In one embodiment, each peripheral device has a queue managed on the individual peripheral device and does not require the host computer to manage the processing of jobs. An alternative embodiment, uses the host computers to store jobs in a queue but allows the peripheral device to request jobs from the queue and otherwise manage the queueing process.

The Job Process system calls provided below are particularly interesting because they allow peripheral devices to redistribute jobs over multiple peripheral devices and host computers. Specifically, the JobSplitInParallel allows a requesting peripheral device to delegate processing of a job to multiple peripheral devices or host computers. Typically, the peripheral devices and host computers assist the requesting peripheral device process data as needed for the particular peripheral device to operate. For example, a printer peripheral device can print a large document much more quickly with the JobSplitInParallel system call which uses multiple printers and host devices to calculate the bit maps for the document and then have the resulting bit maps sent back. Further, the printer can also use a system call such as JobSplitInColor to send the color portion or portions of a print job to color printers while the black and white or non-color portion of the print job is printed on a black and white printer. This saves expensive color printer toner and supplies and increases the overall speed of printing a color and black and white document.

The JobPreProcess system call and JobPostProcess system call are also interesting routines because they allow the printer to determine if the particular job should be sent to a different peripheral device. For example, the JobPreProcess system call can be used to query other peripheral devices and send a job to another peripheral device before the peripheral device begins processing. Typically, the user or application will be given a predetermined time period to approve or disapprove of this transfer before it occurs. Similarly, the JobPostProcess system call operates similarly except that the job is sent after processing has begun on the peripheral device. This routine also allows a peripheral job to be re-routed to a different peripheral device and started over again.

10.1) Job Status
    10.1.1) JobCreationTime( )
    10.1.2) JobStatus( )
    10.1.3) JobAssistantAddr( )
    10.1.3) JobOwnerAddress( )
    10.1.5) JobProcessTime( )
    10.1.6) JobBillingInfo( )
    10.1.7) JobAlert( )

10.2) job information
    10.2.4) JobFormat( )
    10.2.5) JobLocation( )
    10.2.6) JobLoad( )
    10.2.7) JobPreProcess( )
    10.2.8) JobPostProcess( )
    10.2.9) JobLog( )

10.3) job process
    10.3.1) JobProcessPartners( )
    10.3.2) JobForwardAddress( )
    10.3.3) JobSplitInParallel( )
    10.3.4) JobSplitInColor( )
    10.3.5) JobRerouteInError( )

Connectivity with other Digital Devices

These set of system calls are useful in integrating the output from one type of peripheral device with the input of another peripheral device and vice-versa.

Figure 3:
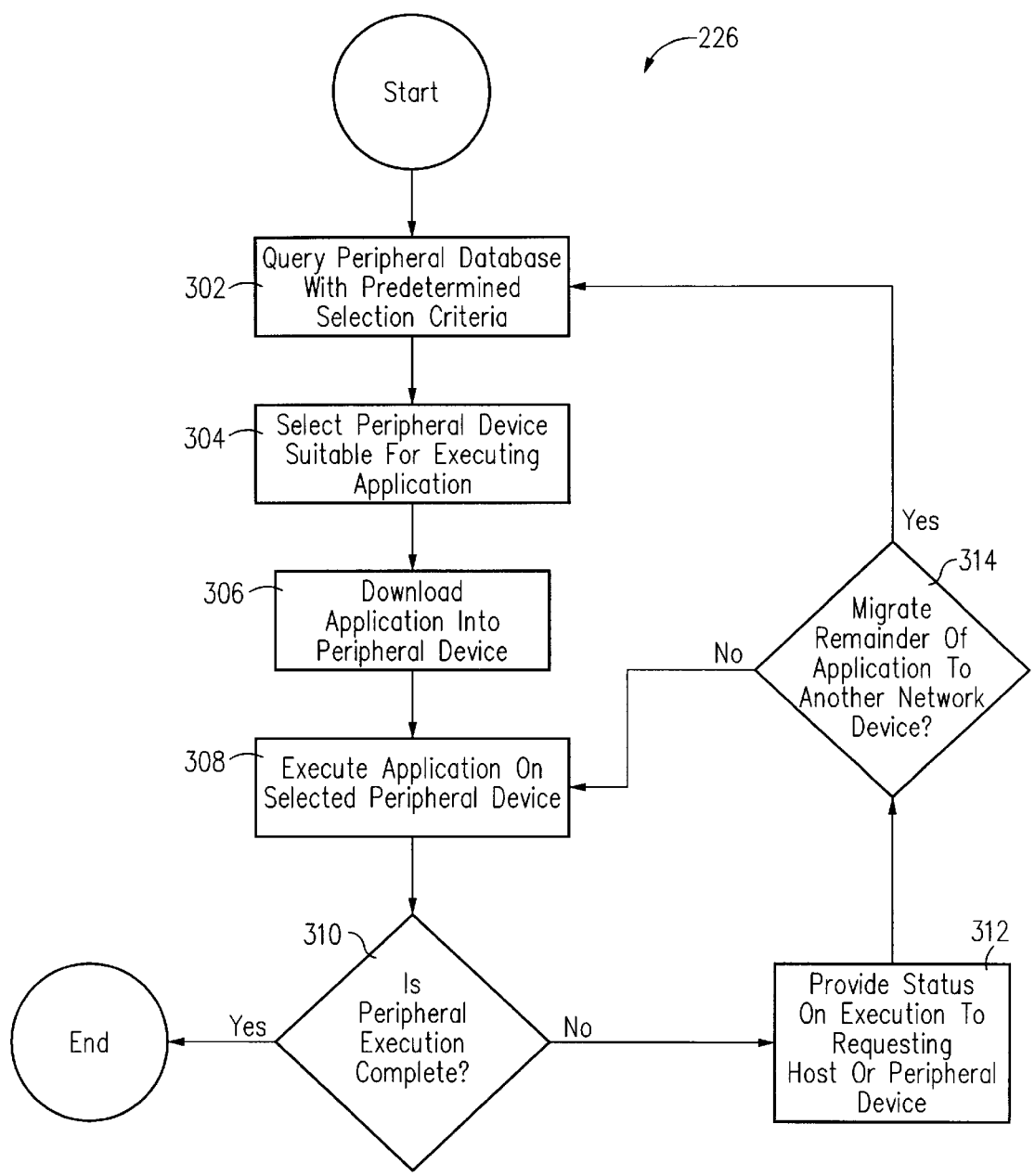
FIG. 3. is a flow chart illustrating the general steps used by one embodiment of the present invention to distribute processing of an application between a host computer and one or more peripheral devices.

11.1) Digital Camera
    11.1.1) GetPicture( )
    11.1.2) SetCameraPictureFormat( )
    11.1.3) SendPicture( )
    11.1.4) SendAddress( )
    11.1.5) InitializeCamera( )
    11.1.6) SetupCamera 11.2) Scanner
    11.2.1) ScanPicture( )
    11.2.2) SetScanPictureFormat( )
    11.2.3) SendPicture( )
    11.2.4) SendAddress( )
    11.2.5) InitializeScanner( )
    11.2.6) SetupScanner 11.3) FAX
    11.3.1) GetFileFormat( )
    11.3.2) GetFile( )
    11.3.3) SendFile( )
    11.3.4) SendAddress( )
    11.3.5) InitializeFax( )
    11.3.6) SetupFax B. Method for Distributed Processing on Host and peripheral Devices Referring to FIG. 3., a flow chart diagram illustrates the general steps used by one embodiment of the present invention to distribute processing of an application between a host computer and one or more peripheral devices. This technique is advantageous because it suggests a peripheral device for use by a user or application based upon a predetermined set of characteristics. For example, a user or application can automatically locate a printer device based on print speed and print capacity rather than the name of the printer. Initially, this process assumes that each peripheral device coupled to the network executes a POST (power on self test) or equivalent application which upon boot up time inserts into peripheral database 110 (FIG. 1) information concerning the capabilities of the particular peripheral device. Typically, the POST application would be a JAVA application which queries the functions available on the peripheral device and reports capabilities and status to the peripheral database 110. Those skilled in the art will understand that peripheral database 110 can be centrally located as illustrated in FIG. 1 or can be distributed over many smaller databases located on the network or even within each of the peripheral devices. Accordingly, references to querying the peripheral database can be unicast (i.e. point-to-point) requests to a central peripheral database or can be broadcast or multicast (many-to-many) requests to each of the smaller databases located on the network.

The process typically begins when a user initiates execution of an application in which a portion of the application requests operation of a peripheral device. In accordance with principles of the present invention these instructions are usually virtual machine instructions generated using the JAVA programming language. At step 302 in FIG. 3, the application uses a predetermined selection criteria to query the peripheral database 110 (FIG. 1) and determine which peripheral device is best suited for performing the desired peripheral operation. Processing transfers from step 302 to step 304, where the method automatically selects a peripheral device for performing the requested job based upon the predetermined selection criteria. In one embodiment, step 304 will provide the user with a prioritized list of peripheral devices and prompt the user to decide which peripheral device should be used. If the user does not respond within a predetermined time period, the peripheral device will automatically operate on the highest priority peripheral device. For example, assume that three printers are coupled to the network and are capable of low-resolution color, high resolution black and white, and high-resolution color printing. An application or user selects a high-resolution color printer in an application running on a host computer. This causes the method to query the peripheral database, determine where the high-resolution color printer is located and then request the high-resolution color printer to perform the operation. However, if the color printer selected is unable to perform the operation, due to lack of resources such as toner or paper, the printer will then download a response application back to the requesting host machine requesting the user or application to select a different set of criteria for printing the job. In response, the user or application can then select the high-resolution black and white printer to print the job instead.

Next, once an appropriate peripheral device is selected, processing transfers from step 304 to step 306 where the portion of the application concerned with using the functions associated with the peripheral device is downloaded into the peripheral device. This application is then executed on the virtual machine instruction processor embedded in the peripheral device. Typically, the data will be transferred to the selected peripheral device along with a portion of the application consisting of virtual machine instructions. In an alternative embodiment, the application is already stored in the peripheral device and step 306 only downloads the data for the peripheral device to operate. In one embodiment, these virtual machine instructions can instruct the peripheral device to perform necessary conversions, image processing routines, font changes, or any other operations necessary for operating on the data before it is suitable for operation by the peripheral device. In one embodiment, the peripheral device is a "thin client" which includes only the minimum hardware and software necessary to execute JAVA applications. The downloading step discussed above then provides the code necessary for the peripheral device to operate. For example, assume a JAVA based printer initially only includes a JAVA virtual machine instruction processor and a JAVA/OS capable of executing JAVA applets or applications. Accordingly, to print, postscript step 306 would download a PostScript interpreter applet and data into the JAVA printer. Similarly, to print FAX information, step 306 downloads the appropriate CCITT group FAX routine and data into the JAVA printer. Essentially, step 306 enables the JAVA printer to operate on different types of data by dynamically reconfiguring the printer with different printing personalities as needed by the particular application.

Processing then continues from step 306 to step 308 where the peripheral device application executes on the peripheral device. Typically, the virtual machine instructions associated with the application are executed at step 308. After a predetermined time period passes, determination step 310 determines if the application executing on the peripheral device is complete. If the application executes to completion, processing transfers from step 310 to the end and the process is complete. However, if for some reason the peripheral device has not completed execution, these instructions can be delegated for execution on another host machine or other peripheral device.

Accordingly, processing transfers from step 310 to step 312 if the processing on the peripheral device is not complete. Initially, step 312 establishes a bidirectional communication between the selected peripheral device and the host computer for transmitting and receiving real-time information generated while the peripheral device is operating. In one embodiment, this is accomplished using object oriented features of the JAVA programming language which allow for socket based communication protocols over TCP/IP to take place between a host computer and a peripheral device coupled to a network. Unlike prior art solutions, the bi-directional communication link of the present invention allows enhanced administration and managing of peripheral devices with a reduced amount of overhead and down time. Many typical causes of a peripheral device failing to operate or going down, such as out of paper or toner low, could be anticipated, reported, and corrected before they cause a major impact on a group of users. Further, in one embodiment, the status information provided at step 312 is used to determine if processing should be distributed on several peripheral devices or host computers.

Essentially, the decision on whether to migrate the remainder of the application to another peripheral device occurs at determination step 314. In one embodiment, a peripheral device decides to use the processing power of another machine to perform certain functions in parallel and speed up the peripheral device processing. For example, a high-resolution color printer may need to perform some image enhancements on an image before printing the output. This color printer may delegate these calculation intensive routines to a host computer on the network while the color printer is laying out the format of the page. This type of flexible distributed processing is a powerful feature of the present invention.

In an alternative embodiment, the user can determine whether the peripheral device should migrate to another peripheral device or host computer. Typically, the application executing on the peripheral device prompts the user to make this determination. If the user decides not to migrate the application to one or more peripheral devices, processing continues on the same device and control passes from step 314 to step 308. This approach can take longer because only one processor is used for processing the output or input. Alternatively, the user may decide to migrate the peripheral application to one or more different devices. If this latter choice is made, processing would transfer from step 314 to step 302 where the above steps 302 through 312 would be repeated. This would potentially reduce the time it takes to perform the particular operation on the peripheral device. For example, a user can print a large job which includes color drawings by distributing the print job over a number of different printers. The black and white pages can be sent to one or more high speed black and white printers while the color print job is sent to a relatively slow color printer. This arrangement overlaps the color printing with the black and white printing and decreases the time to print the job. It also conserves resources by reserving the more expensive colors and pigments used on the color printer for color printing rather than printing black and white.

Figure 4:
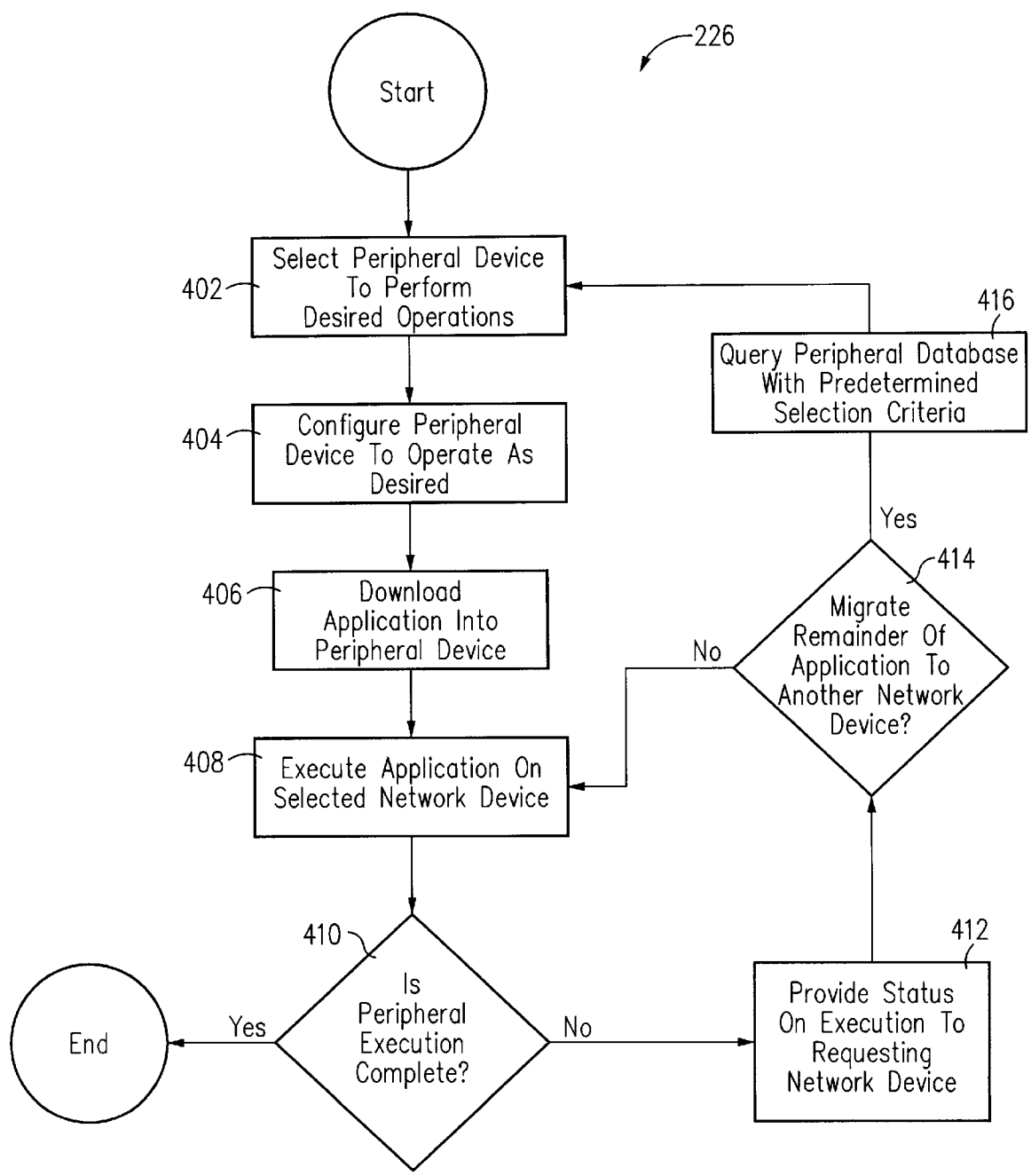
FIG. 4. is a flow chart illustrating the general steps used by an alternative embodiment of the present invention to distribute processing of an application between a host computer and one or more peripheral devices.

Referring to FIG. 4., a flow chart illustrates the general steps used by an alternative embodiment of the present invention to distribute processing of an application between a host computer and one or more peripheral devices. This technique is similar to the previous technique discussed above and illustrated in FIG. 3 except that the user or application requests a specific peripheral device which is located nearby or well known to the user. Like the previous technique discussed above, processing can be distributed on one or more peripheral devices or host computers.

Initially, the process illustrated in FIG. 4 assumes that each peripheral device coupled to the network executes a POST (power on self test) or equivalent application which upon boot up time inserts into peripheral database 110 (FIG. 1) information concerning the capabilities of the particular peripheral device. Typically, the POST application would be a JAVA application which queries the functions available on the peripheral device and reports capabilities and status to the peripheral database 110. This operates similar to the technique discussed above.

This process typically begins when a user initiates execution of an application in which a portion of the application requests operation of a peripheral device. In accordance with principles of the present invention these instructions are usually virtual machine instructions generated using the JAVA programming language. At step 402 in FIG. 4, the user selects a specific peripheral device by name to perform the given operation. Processing transfers from step 402 to step 404, where the method then selects and configures the peripheral device to perform the requested operation. In one embodiment, this step will attempt to configure the peripheral device at the best possible settings under the circumstances and notify the user or application accordingly. For example, if the user requests 3000 dpi from a 1200 dpi printer device, step 404 will set the requested peripheral device to 1200 dpi and notify the user that a lower setting is being used. If the user does not respond within a predetermined time period, the peripheral device will assume the user is happy with the modification.

Next, once an appropriate peripheral device is selected and configured, processing transfers from step 404 to step 406 where the portion of the application concerned with using the functions associated with the peripheral device is downloaded into the peripheral device. This application is then executed on the virtual machine instruction processor 108 (FIG. 1) embedded in the peripheral device. Typically, the data will be transferred to the selected peripheral device along with a portion of the application consisting of virtual machine instructions. In an alternative embodiment, the application required for operating the peripheral device is already downloaded into the peripheral device and step 406 need only download the data for the peripheral device to operate. Step 406 operates in a manner similar to step 306 in FIG. 3 discussed above.

Processing then continues from step 406 to step 408 where the peripheral device application executes on the peripheral device. Typically, the virtual machine instructions associated with the application are executed at step 408. After a predetermined time period, determination step 410 determines if the application executing on the peripheral device is complete. If the application executes to completion, processing transfers from step 410 to the end and the process is complete. However, if for some reason the peripheral device has not completed execution, these instructions can be transferred to another host machine or other peripheral device.

Accordingly, processing transfers from step 410 to step 412 if the processing on the peripheral device is not complete. Initially, step 412 establishes a bidirectional communication between the selected peripheral device and the host computer for transmitting and receiving real-time information generated while the peripheral device is operating. Step 412 operates in a manner similar to step 312 in FIG. 3 discussed above.

Essentially, the decision on whether to migrate the remainder of the application to another peripheral device occurs at determination step 414 in FIG. 4. Like step 314 in FIG. 3 discussed above, if the user or application decides not to migrate the processing to one or more peripheral devices, processing continues on the same device and control passes from step 414 to step 408. Alternatively, the user or application may decide to migrate the peripheral application to one or more different devices. If this latter choice is made, processing transfers from step 414 to step 416 where a predetermined selection criteria is used to query peripheral database 10 (FIG. 1) and determine which peripheral device is best suited for performing the desired peripheral operation. Processing then transfers from step 416 to step 402, where the method automatically selects a peripheral device for performing the requested job based upon the predetermined selection criteria. In one embodiment, this step will provide the user with a prioritized list of peripheral devices and prompt the user to decide which peripheral device should be used. If the user does not respond within a predetermined time period, the peripheral device will automatically operate using the highest priority peripheral device.

C. Exemplary Applications for Distributed Processing on Host and peripheral Devices Using systems designed in accordance with the present invention, numerous applications previously unavailable in the art can be developed which simplify peripheral device operation and management. These peripheral device applications automatically adapt to most networks, hosts, or peripheral devices because, in part, each device is capable of executing the same set of virtual instructions. Large complex drivers used to convert data formats and drive hardware signals on a peripheral device are replaced with general purpose virtual machine instruction applications written in languages such as JAVA. Typically, these general purpose virtual machine instruction applications are self-contained and therefore can be executed on almost any peripheral device or host device on the network for processing. For example, a user who wants to print a particular graphic format file such as a JPEG file on a printer does not have to use a driver to convert the JPEG file into the format prescribed by the printer such as PostScript. Instead, the application used to print the particular graphic file will down load an application, or applet, into the printer for printing JPEG along with the data to be printed. The printer will then execute the JPEG applet and print the file on the printer.

Moreover, applications developed using embodiments of the present invention perform load distribution based on the requirements of each application. These applications are not limited to the processing power available on either a host computer or a peripheral device but can distribute the load between many host computers and peripheral devices. A portion of the processing suitable for the host computer, such as extensive floating point calculations, can be performed on the host computer while relatively straightforward conversion routines can be performed on one or more peripheral devices. For example, a user having a large print job can use a printing application to distribute portions of the print job to different printers in a printer pool without reconfiguring the printers or reloading special device drivers. Instead, the applications will query the peripheral device database to determine the number of printers available and then download a printing applet and the corresponding data into the various printers. Essentially, this dynamically distributes a print job for parallelized printing. For efficiency, the application can also detect which pages of a print job are color and send them to a slower, higher resolution color printer while sending the black and white portions of the file to higher speed, lower resolution black and white printers. These techniques have increased economic efficiencies and relieve the user from tedious configuration details.

Peripheral device management and diagnosis applications can also exploit the novel features provided in systems of the present invention. For example, self-administered peripheral devices can be developed which reduce the need for extensive service and monitoring by administrative personnel. At a predetermined time period, an application running on a host computer can download applications, or applets, into each peripheral device and gather very detailed information on the peripheral device operation. The peripheral device, such as a printer, can execute the applet and determine what areas of the peripheral device need repair or are close to being depleted. Next, the peripheral device can establish a bi-directional communication link to provide status on the peripheral device. If the peripheral device is a printer, this information may include information on the amount of paper available, amount of toner, time remaining before a service, or cleaning. Using this information, the application running on the host can determine which peripheral device should be used and which peripheral device should not be used. In another aspect, these applications are advantageous because a single vendor can develop one application which interoperates with all peripheral devices having a virtual machine instruction processor and adhering to teachings provided by the present invention.

Systems of the present invention also facilitate the development of applications which allow remote administration and use of printers over a network or other bidirectional communication mechanism. In one embodiment, a remote administration application includes a skelatal remote administration applet located on a host computer and a series of smaller control applets located on each peripheral device. Typically, the control applet is developed by the peripheral device manufacturer. The control applets located on each peripheral device are capable of controlling the peripheral device they are stored on and can be plugged into the skelatal remote administration application on demand when a particular peripheral device must be configured or checked. This modular approach to managing peripheral devices allows for access to the features of each peripheral device without requiring the loading of different proprietary software applications. In operation, the remote administration application downloads virtual machine instruction applet over a network connection into the peripheral device which requests the peripheral device's control applet. Upon execution in the peripheral device, the downloaded virtual machine instruction applet then instructs the peripheral device to locate and return the control applet within the peripheral device which understands the operation of the device. The control applet is then plugged into the skeletal remote administration application and enables a person to manage the particular peripheral device. In one embodiment, the remote administration application is a JAVA enabled brouser running the JAVA virtual machine and the applets downloaded from the peripheral device are written in JAVA virtual machine instruction bytecodes. Essentially, almost any peripheral device can be managed from almost any location on a network because the control applet is retrieved from the peripheral device on demand. Further, the skeletal remote administration application can be used on almost any host computer because the host computer and peripheral devices run compatible virtual machine instructions.

Applications developed using systems of the present invention also facilitate peripheral devices which are self-configuring and capable of performing automatic upgrading/updating. In this application, a peripheral device registers a peripheral profile with a peripheral database when the device is attached to the network and performs a power on self-test (POST). After POST, an applet stored in non-volatile memory (NVRAM) or other storage medium of the peripheral device requests a configuration applet from the peripheral database. In response, the peripheral database downloads an applet of virtual machine instructions which automatically configures the peripheral device to work in a predetermined manner. For example, an applet could be downloaded into a printer peripheral device which causes the printer device to use a TimesRoman font, print landscape, and use papers initially from tray 1. This self-configuring option would speed up initial printer configuration significantly and allow for printer devices to be relocated on a network with minimal impact on the user community.

Further, in another embodiment of the present invention a peripheral device checks a host computer over the Internet or an intranet at a predetermined time interval, for example once a month, for updates and software upgrades. If an upgrade exists, the peripheral device automatically downloads the upgrade and begins executing it. Alternatively, the peripheral device downloads a notification applet to the appropriate personnel on the host computer requesting that the upgrade or update be made. Upgrading or updating the peripheral device in this instance is user initiated and not automatic. For example, assume the manufacturer of a digital camera having a virtual machine processor discovers a better method for dithering and interpolating pixels in the digital camera which improves the visual acuity and resolution of the camera output by 10%–50%. On the first of each month, the digital camera contacts the manufacturer's web site on the Internet and checks for upgrades. When the digital camera discovers the upgrade, the camera establishes a bi-directional communication with an application on the web site verifying serial numbers and warranty information thus authorizing the upgrade. Next, the camera receives the upgrade in the form of an application having virtual machine instructions and begins executing the instructions immediately. Further, if the method is in the public domain, almost any digital camera having a virtual machine instruction processor could engage in a similar process and download the upgrade and therefore take advantage of the new discovery as well. This technique is a significant improvement over current techniques in which the user must manually load upgrades or must obtain and install a new PROM into the peripheral device.

In yet another embodiment, peripheral devices are coupled together directly to process information and do not require intervention by a host computer or similar central processing device. For example, a printer device having a virtual machine instruction processor is coupled directly to a digital camera without using a host computer. This allows the camera to take pictures and print them directly on the printer. Specifically, the camera captures the image data in digital form and then downloads the virtual machine instruction application for printing the particular data format, such as PostScript, along with the actual image data into the printer. The printer would then execute the virtual machine instruction application and use the data to print the information out.

While specific embodiments have been described herein for purposes of illustration, various modifications may be made without departing from the spirit and scope of the invention. Those skilled in the art understand that the present invention can be implemented using a variety of different networking protocols and is not limited to computer systems coupled to a network using the TCPIP protocol. Alternative embodiments substantially similar to the embodiments discussed above could be implemented except that the network protocol would be SNA, Appletalk, IPX, X.25, SLIP, or PPP. Those skilled in the art understand that computer systems running TCP/IP can also communicate with other computer systems running other diverse network protocols such as SNA (Systems Network Architecture), IPX, Appletalk, or X.25. Furthermore, another alternative embodiment substantially similar to the embodiment discussed above could be implemented except that the virtual machine processor is simulated using a processor executing a proprietary instruction set such as the x86 architectures by Intel, Inc. of Sunnyvale, or the PowerPC architecture by Motorola of Schaumburg Illinois. Yet another alternative embodiment substantially similar to the embodiments discussed above could be implemented except that they operate in an environment using virtual machine instructions other than the JAVA language and environment. Accordingly, the invention is not limited to the above described embodiments, but instead is defined by the appended claims in light of their full scope of equivalents.

Page: 47

APPENDIX I

The JAVA Virtual Machine Specification

©1993, 1994, 1995 Sun Microsystems, Inc.
2550 Garcia Avenue, Mountain View, California 94043-1100 U.S.A.

All rights reserved. This BETA quality release and related documentation are protected by copyright and distributed under licenses restricting its use, copying, distribution, and decompilation. No part of this release or related documentation may be reproduced in any form by any means without prior written authorization of Sun and its licensors, if any.

Portions of this product may be derived from the UNIX® and Berkeley 4.3 BSD systems, licensed from UNIX System Laboratories, Inc. and the University of California, respectively. Third-party font software in this release is protected by copyright and licensed from Sun's Font Suppliers.

RESTRICTED RIGHTS LEGEND: Use, duplication, or disclosure by the United States Government is subject to the restrictions set forth in DFARS 252.227-7013 (c)(1)(ii) and FAR 52.227-19.

The release described in this manual may be protected by one or more U.S. patents, foreign patents, or pending applications.

TRADEMARKS

Sun, Sun Microsystems, Sun Microsystems Computer Corporation, the Sun logo, the Sun Microsystems Computer Corporation logo, WebRunner, JAVA, FirstPerson and the FirstPerson logo and agent are trademarks or registered trademarks of Sun Microsystems, Inc. The "Duke" character is a trademark of Sun Microsystems, Inc. and Copyright (c) 1992-1995 Sun Microsystems, Inc. All Rights Reserved. UNIX® is a registered trademark in the United States and other countries, exclusively licensed through X/Open Company, Ltd. OPEN LOOK is a registered trademark of Novell, Inc. All other product names mentioned herein are the trademarks of their respective owners.

All SPARC trademarks, including the SCD Compliant Logo, are trademarks or registered trademarks of SPARC International, Inc. SPARCstation, SPARCserver, SPARCengine, SPARCworks, and SPARCompiler are licensed exclusively to Sun Microsystems, Inc. Products bearing SPARC trademarks are based upon an architecture developed by Sun Microsystems, Inc.

The OPEN LOOK® and SunÔ Graphical User Interfaces were developed by Sun Microsystems, Inc. for its users and licensees. Sun acknowledges the pioneering efforts of Xerox in researching and developing the concept of visual or graphical user interfaces for the computer industry. Sun holds a non-exclusive license from Xerox to the Xerox Graphical User Interface, which license also covers Sun's licensees who implement OPEN LOOK GUIs and otherwise comply with Sun's written license agreements.

X Window System is a trademark and product of the Massachusetts Institute of Technology.

THIS PUBLICATION IS PROVIDED "AS IS" WITHOUT WARRANTY OF ANY KIND, EITHER EXPRESS OR IMPLIED, INCLUDING, BUT NOT LIMITED TO, THE

Page: 48

IMPLIED WARRANTIES OF MERCHANTABILITY, FITNESS FOR A PARTICULAR PURPOSE, OR NON-INFRINGEMENT.

THIS PUBLICATION COULD INCLUDE TECHNICAL INACCURACIES OR TYPOGRAPHICAL ERRORS. CHANGES ARE PERIODICALLY ADDED TO THE INFORMATION HEREIN; THESE CHANGES WILL BE INCORPORATED IN NEW EDITIONS OF THE PUBLICATION. SUN MICROSYSTEMS, INC. MAY MAKE IMPROVEMENTS AND/OR CHANGES IN THE PRODUCT(S) AND/OR THE PROGRAM(S) DESCRIBED IN THIS PUBLICATION AT ANY TIME.

Preface

This document describes version 1.0 of the JAVA Virtual Machine and its instruction set. We have written this document to act as a specification for both compiler writers, who wish to target the machine, and as a specification for others who may wish to implement a compliant JAVA Virtual Machine.

The JAVA Virtual Machine is an imaginary machine that is implemented by emulating it in software on a real machine. Code for the JAVA Virtual Machine is stored in .class files, each of which contains the code for at most one public class.

Simple and efficient emulations of the JAVA Virtual Machine are possible because the machine's format is compact and efficient bytecodes. Implementations whose native code speed approximates that of compiled C are also possible, by translating the bytecodes to machine code, although Sun has not released such implementations at this time.

The rest of this document is structured as follows:
Chapter 1 describes the architecture of the JAVA Virtual Machine;
Chapter 2 describes the .class file format;
Chapter 3 describes the bytecodes; and
Appendix A contains some instructions generated internally by Sun's implementation of the JAVA Virtual Machine. While not strictly part of the specification we describe these here so that this specification can serve as a reference for our implementation. As more implementations of the JAVA Virtual Machine become available, we may remove Appendix A from future releases.

Sun will license the JAVA Virtual Machine trademark and logo for use with compliant implementations of this specification. If you are considering constructing your own implementation of the JAVA Virtual Machine please contact us, at the email address below, so that we can work together to insure 100% compatibility of your implementation.

Send comments on this specification or questions about implementing the JAVA Virtual Machine to our electronic mail address:JAVA@JAVA.sun.com.

1.       JAVA Virtual Machine Architecture
1.1     Supported Data Types

The virtual machine data types include the basic data types of the JAVA language:

```
byte     // 1-byte signed 2's complement integer
short    // 2-byte signed 2's complement integer
```

Page: 49

```
int      // 4-byte signed 2's complement integer
long     // 8-byte signed 2's complement integer
float    // 4-byte IEEE 754 single-precision float
double   // 8-byte IEEE 754 double-precision float
char     // 2-byte unsigned Unicode character
```

Nearly all JAVA type checking is done at compile time. Data of the primitive types shown above need not be tagged by the hardware to allow execution of JAVA. Instead, the bytecodes that operate on primitive values indicate the types of the operands so that, for example, the iadd, ladd, fadd, and dadd instructions each add two numbers, whose types are int, long, float, and double, respectively The virtual machine doesn't have separate instructions for boolean types. Instead, integer instructions, including integer returns, are used to operate on boolean values; byte arrays are used for arrays of boolean.

The virtual machine specifies that floating point be done in IEEE 754 format, with support for gradual underflow. Older computer architectures that do not have support for IEEE format may run JAVA numeric programs very slowly.

Other virtual machine data types include:

```
object          // 4-byte reference to a JAVA object
returnAddress   // 4 bytes, used with jsr/ret/jsr_w/ret_w instructions
```

Note: JAVA arrays are treated as objects.

This specification does not require any particular internal structure for objects. In our implementation an object reference is to a handle, which is a pair of pointers: one to a method table for the object, and the other to the data allocated for the object. Other implementations may use inline caching, rather than method table dispatch; such methods are likely to be faster on hardware that is emerging between now and the year 2000.

Programs represented by JAVA Virtual Machine bytecodes are expected to maintain proper type discipline and an implementation may refuse to execute a bytecode program that appears to violate such type discipline.

While the JAVA Virtual Machines would appear to be limited by the bytecode deònition to running on a 32-bit address space machine, it is possible to build a version of the JAVA Virtual Machine that automatically translates the bytecodes into a 64-bit form. A description of this transformation is beyond the scope of the JAVA Virtual Machine Specification.

1.2     Registers

At any point the virtual machine is executing the code of a single method, and the pc register contains the address of the next bytecode to be executed.

Each method has memory space allocated for it to hold:
a set of local variables, referenced by a vars register;
an operand stack, referenced by an optop register; and
a execution environment structure, referenced by a frame register.

All of this space can be allocated at once, since the size of the local variables and operand stack are known at compile time, and the size of the execution environment structure is well-known to the interpreter.

Page: 50

All of these registers are 32 bits wide.

1.3   Local Variables

Each JAVA method uses a fixed-sized set of local variables. They are addressed as word offsets from the vars register. Local variables are all 32 bits wide.

Long integers and double precision floats are considered to take up two local variables but are addressed by the index of the first local variable. (For example, a local variable with index containing a double precision float actually occupies storage at indices n and n+1.) The virtual machine specification does not require 64-bit values in local variables to be 64-bit aligned. Implementors are free to decide the appropriate way to divide long integers and double precision floats into two words.

Instructions are provided to load the values of local variables onto the operand stack and store values from the operand stack into local variables.

1.4   The Operand Stack

The machine instructions all take operands from an operand stack, operate on them, and return results to the stack. We chose a stack organization so that it would be easy to emulate the machine efficiently on machines with few or irregular registers such as the Intel 486 microprocessor.

The operand stack is 32 bits wide. It is used to pass parameters to methods and receive method results, as well as to supply parameters for operations and save operation results.

For example, execution of instruction iadd adds two integers together. It expects that the two integers are the top two words on the operand stack, and were pushed there by previous instructions. Both integers are popped from the stack, added, and their sum pushed back onto the operand stack. Subcomputations may be nested on the operand stack, and result in a single operand that can be used by the nesting computation.

Each primitive data type has specialized instructions that know how to operate on operands of that type. Each operand requires a single location on the stack, except for long and double operands, which require two locations.

Operands must be operated on by operators appropriate to their type. It is illegal, for example, to push two integers and then treat them as a long. This restriction is enforced, in the Sun implementation, by the bytecode verifier. However, a small number of operations (the dup opcodes and swap) operate on runtime data areas as raw values of a given width without regard to type.

In our description of the virtual machine instructions below, the effect of an instruction's execution on the operand stack is represented textually, with the stack growing from left to right, and each 32-bit word separately represented. Thus:

Stack: ..., value1, value2 P ..., value3 shows an operation that begins by having value2 on top of the stack with value1 just beneath it. As a result of the execution of the instruction, value1 and value2 are popped from the stack and replaced by value3, which has been calculated by the instruction. The remainder of the stack, represented by an ellipsis, is unaffected by the instruction's execution.

The types long and double take two 32-bit words on the operand stack:

Stack: ... P ..., value-word1,value-word2

Page: 51

This specification does not say how the two words are selected from the 64-bit long or double value; it is only necessary that a particular implementation be internally consistent.

1.5     Execution Environment

The information contained in the execution environment is used to do dynamic linking, normal method returns, and exception propagation.

1.5.1   Dynamic Linking

The execution environment contains references to the interpreter symbol table for the current method and current class, in support of dynamic linking of the method code. The class file code for a method refers to methods to be called and variables to be accessed symbolically. Dynamic linking translates these symbolic method calls into actual method calls, loading classes as necessary to resolve as-yet-undefined symbols, and translates variable accesses into appropriate offsets in storage structures associated with the runtime location of these variables.

This late binding of the methods and variables makes changes in other classes that a method uses less likely to break this code.

1.5.2   Normal Method Returns

If execution of the current method completes normally, then a value is returned to the calling method. This occurs when the calling method executes a return instruction appropriate to the return type.

The execution environment is used in this case to restore the registers of the caller, with the program counter of the caller appropriately incremented to skip the method call instruction. Execution then continues in the calling method's execution environment.

1.5.3   Exception and Error Propagation

An exceptional condition, known in JAVA as an Error or Exception, which are subclasses of Throwable, may arise in a program because of:

a dynamic linkage failure, such as a failure to find a needed class file;

a run-time error, such as a reference through a null pointer;

an asynchronous event, such as is thrown by Thread.stop, from another thread; and the program using a throw statement.

When an exception occurs:

A list of catch clauses associated with the current method is examined. Each catch clause describes the instruction range for which it is active, describes the type of exception that it is to handle, and has the address of the code to handle it.

An exception matches a catch clause if the instruction that caused the exception is in the appropriate instruction range, and the exception type is a subtype of the type of exception that the catch clause handles. If a matching catch clause is found, the system branches to the specified handler. If no handler is found, the process is repeated until all the nested catch clauses of the current method have been exhausted.

Page: 52

The order of the catch clauses in the list is important. The virtual machine execution continues at the first matching catch clause. Because JAVA code is structured, it is always possible to sort all the exception handlers for one method into a single list that, for any possible program counter value, can be searched in linear order to find the proper (innermost containing applicable) exception handler for an exception occurring at that program counter value.

If there is no matching catch clause then the current method is said to have as its outcome the uncaught exception. The execution state of the method that called this method is restored from the execution environment, and the propagation of the exception continues, as though the exception had just occurred in this caller.

1.5.4 Additional Information

The execution environment may be extended with additional implementation-specified information, such as debugging information.

1.6 Garbage Collected Heap

The JAVA heap is the runtime data area from which class instances (objects) are allocated. The JAVA language is designed to be garbage collected - it does not give the programmer the ability to deallocate objects explicitly. The JAVA language does not presuppose any particular kind of garbage collection; various algorithms may be used depending on system requirements.

1.7 Method Area

The method area is analogous to the store for compiled code in conventional languages or the text segment in a UNIX process. It stores method code (compiled JAVA code) and symbol tables. In the current JAVA implementation, method code is not part of the garbage-collected heap, although this is planned for a future release.

.8 The JAVA Instruction Set

An instruction in the JAVA instruction set consists of a one-byte opcode specifying the operation to be performed, and zero or more operands supplying parameters or data that will be used by the operation. Many instructions have no operands and consist only of an opcode.

The inner loop of the virtual machine execution is effectively:
do {
    fetch an opcode byte
    execute an action depending on the value of the opcode
} while (there is more to do);

The number and size of the additional operands is determined by the opcode. If an additional operand is more than one byte in size, then it is stored in big-endian order - high order byte first. For example, a 16-bit parameter is stored as two bytes whose value is:
first_byte * 256 + second_byte The bytecode instruction stream is only byte-aligned, with the exception being the tableswitch and lookupswitch instructions, which force alignment to a 4-byte boundary Page: 53 within their instructions.

These decisions keep the virtual machine code for a compiled JAVA program compact and reflect a conscious bias in favor of compactness at some possible cost in performance.

1.9     Limitations

The per-class constant pool has a maximum of 65535 entries. This acts as an internal limit on the total complexity of a single class.

The amount of code per method is limited to 65535 bytes by the sizes of the indices in the code in the exception table, the line number table, and the local variable table.

Besides this limit, the only other limitation of note is that the number of words of arguments in a method call is limited to 255.

2.      Class File Format

This chapter documents the JAVA class (.class) file format.

Each class file contains the compiled version of either a JAVA class or a JAVA interface. Compliant JAVA interpreters must be capable of dealing with all class files that conform to the following specification.

A JAVA class file consists of a stream of 8-bit bytes. All 16-bit and 32-bit quantities are constructed by reading in two or four 8-bit bytes, respectively. The bytes are joined together in network (big-endian) order, where the high bytes come first. This format is supported by the JAVA JAVA.io.DataInput and JAVA.io.DataOutput interfaces, and classes such as JAVA.io.DataInputStream and JAVA.io.DataOutputStream.

The class file format is described here using a structure notation. Successive fields in the structure appear in the external representation without padding or alignment. Variable size arrays, often of variable sized elements, are called tables and are commonplace in these structures.

The types u1, u2, and u4 mean an unsigned one-, two-, or four-byte quantity, respectively, which are read by method such as readUnsignedByte, readUnsignedShort and readInt of the JAVA.io.DataInput interface.

2.1     Format

The following pseudo-structure gives a top-level description of the format of a class file:

```
ClassFile {
        u4 magic;
        u2 minor_version;
        u2 major_version;
        u2 constant_pool_count;
        cp_info constant_pool[constant_pool_count - 1];
        u2 access_flags;
        u2 this_class;
        u2 super_class;
        u2 interfaces_count;
```

Page: 54

```
        u2 interfaces[interfaces_count];
        u2 fields_count;
        field_info fields[fields_count];
        u2 methods_count;
        method_info methods[methods_count];
        u2 attributes_count;
        attribute_info attributes[attribute_count];
}
```
magic
    This field must have the value 0xCAFEBABE.
minor_version, major_version
    These fields contain the version number of the JAVA compiler that produced this class file. An implementation of the virtual machine will normally support some range of minor version numbers 0-n of a particular major version number. If the minor version number is incremented the new code won't run on the old virtual machines, but it is possible to make a new virtual machine which can run versions up to n+1.
    A change of the major version number indicates a major incompatible change, one that requires a different virtual machine that may not support the old major version in any way.
    The current major version number is 45; the current minor version number is 3.
constant_pool_count
    This field indicates the number of entries in the constant pool in the class file.
constant_pool
    The constant pool is a table of values. These values are the various string constants, class names, field names, and others that are referred to by the class structure or by the code.
    constant_pool[0] is always unused by the compiler, and may be used by an implementation for any purpose.
    Each of the constant_pool entries 1 through constant_pool_count-1 is a variable-length entry, whose format is given by the first "tag" byte, as described in section 2.3.
access_flags
    This field contains a mask of up to sixteen modifiers used with class, method, and field declarations. The same encoding is used on similar fields in field_info and method_info as described below. Here is the encoding:
Flag Name
Value
Meaning
Used By ACC_PUBLIC
0x0001
Visible to everyone
Class, Method, Variable Page: 55

ACC_PRIVATE
0x0002
Visible only to the defining class
Method, Variable

ACC_PROTECTED
0x0004
Visible to subclasses
Method, Variable

ACC_STATIC
0x0008
Variable or method is static
Method, Variable

ACC_FINAL
0x0010
No further subclassing, overriding, or assignment after initialization
Class, Method, Variable ACC_SYNCHRONIZED
0x0020
Wrap use in monitor lock
Method ACC_VOLATILE
0x0040
Can't cache
Variable ACC_TRANSIENT
0x0080
Not to be written or read by a persistent object manager
Variable ACC_NATIVE
0x0100
Implemented in a language other than JAVA
Method ACC_INTERFACE
0x0200
Is an interface
Class Page: 56

ACC_ABSTRACT
0x0400
No body provided
Class, Method this_class
    This field is an index into the constant pool; constant_pool [this_class] must be a CONSTANT_class.
super_class
    This field is an index into the constant pool. If the value of super_class is nonzero, then constant_pool [super_class] must be a class, and gives the index of this class's superclass in the constant pool.
    If the value of super_class is zero, then the class being defined must be JAVA.lang.Object, and it has no superclass.
interfaces_count
    This field gives the number of interfaces that this class implements.
interfaces
    Each value in this table is an index into the constant pool. If a table value is nonzero (interfaces[i] != 0, where 0 <= i <interfaces_count), then constant_pool [interfaces[i]] must be an interface that this class implements.

fields_count
    This field gives the number of instance variables, both static and dynamic, defined by this class. The fields table includes only those variables that are defined explicitly by this class. It does not include those instance variables that are accessible from this class but are inherited from superclasses.
fields
    Each value in this table is a more complete description of a field in the class. See section 2.4 for more information on the field_info structure.
methods_count
    This field indicates the number of methods, both static and dynamic, defined by this class. This table only includes those methods that are explicitly defined by this class. It does not include inherited methods.
methods
    Each value in this table is a more complete description of a method in the class. See section 2.5 for more information on the method_info structure.
attributes_count
    This field indicates the number of additional attributes about this class.
attributes
    A class can have any number of optional attributes associated with it. Currently, the only class attribute recognized is the "SourceFile" attribute, which indicates the name of the source file from which this class file was compiled. See section 2.6 for more information on the attribute_info structure.

Page: 57

2.2    Signatures
A signature is a string representing a type of a method, field or array.
The field signature represents the value of an argument to a function or the value of a variable. It is a series of bytes generated by the following grammar:

```
<field_signature> ::= <field_type>
<field_type>    ::=<base_type>|<object_type>|
                                                <array_type>
<base_type>     ::= B|C|D|F|I|J|S|Z
<object_type>   ::= L<fullclassname>;
<array_type>    ::=[<optional_size><field_type>
<optional_size> ::= [0-9]
```

The meaning of the base types is as follows:

| | | |
|---|---|---|
| B | byte | signed byte |
| C | char | character |
| D | double | double precision IEEE float |
| F | float | single precision IEEE float |
| I | int | integer |
| J | long | long integer |
| L<fullclassname>;... | | an object of the given class |
| S | short | signed short |
| Z | boolean | true or false |
| [<field sig> | ... | array |

A return-type signature represents the return value from a method. It is a series of bytes in the following grammar:

```
<return_signature>::= <field_type> | V
```

The character V indicates that the method returns no value. Otherwise, the signature indicates the type of the return value.

An argument signature represents an argument passed to a method:

```
<argument_signature>  ::= <field_type>
```

A method signature represents the arguments that the method expects, and the value that it returns.

```
<method_signature>::= (<arguments_signature>) <return_signature>
<arguments_signature>  ::= <argument_signature>*
```

2.3    Constant Pool
Each item in the constant pool begins with a 1-byte tag:. The table below lists the valid tags and their values.
Constant Type
Value CONSTANT_Class
CONSTANT_Fieldref
CONSTANT_Methodref
CONSTANT_InterfaceMethodref Page: 58

CONSTANT_String
CONSTANT_Integer
CONSTANT_Float
CONSTANT_Long
CONSTANT_Double
CONSTANT_NameAndType
CONSTANT_Utf8
CONSTANT_Unicode
7
9
10
11
8
3
4
5
6
12
1
2

Each tag byte is then followed by one or more bytes giving more information about the specific constant.

2.3.1 CONSTANT_Class
CONSTANT_Class is used to represent a class or an interface.
CONSTANT_Class_info {
    u1 tag;
    u2 name_index;
}
tag
    The tag will have the value CONSTANT_Class
name_index
    constant_pool[name_index] is a CONSTANT_Utf8 giving the string name of the class.

Because arrays are objects, the opcodes anewarray and multianewarray can reference array "classes" via CONSTANT_Class items in the constant pool. In this case, the name of the class is its signature. For example, the class name for
    int[][]
is
    [[I
The class name for
    Thread[]

is
"[LJAVA.lang.Thread;"

2.3.2 CONSTANT_{Fieldref,Methodref, InterfaceMethodref}
Fields, methods, and interface methods are represented by similar structures.

```
CONSTANT_Fieldref_info {
        u1 tag;
        u2 class_index;
        u2 name_and_type_index;
}
CONSTANT_Methodref_info {
        u1 tag;
        u2 class_index;
        u2 name_and_type_index;
}
CONSTANT_InterfaceMethodref_info {
        u1 tag;
        u2 class_index;
        u2 name_and_type_index;
}
``` tag
The tag will have the value CONSTANT_Fieldref, CONSTANT_Methodref, or CONSTANT_InterfaceMethodref.

class_index
constant_pool[class_index] will be an entry of type CONSTANT_Class giving the name of the class or interface containing the field or method.

For CONSTANT_Fieldref and CONSTANT_Methodref, the CONSTANT_Class item must be an actual class. For CONSTANT_InterfaceMethodref, the item must be an interface which purports to implement the given method.

name_and_type_index
constant_pool [name_and_type_index] will be an entry of type CONSTANT_NameAndType. This constant pool entry indicates the name and signature of the field or method.

2.3.3    CONSTANT_String
CONSTANT_String is used to represent constant objects of the built-in type String.

```
CONSTANT_String_info {
        u1 tag;
        u2 string_index;
}
``` tag
The tag will have the value CONSTANT_String

Page: 60 string_index constant_pool [string_index] is a CONSTANT_Utf8 string giving the value to which the String object is initialized.

2.3.4   CONSTANT_Integer and CONSTANT_Float
CONSTANT_Integer andCONSTANT_Float represent four-byte constants.
```
CONSTANT_Integer_info {
        u1 tag;
        u4 bytes;
}
CONSTANT_Float_info {
        u1 tag;
        u4 bytes;
}
```
tag The tag will have the value CONSTANT_Integer or CONSTANT_Float bytes For integers, the four bytes are the integer value. For floats, they are the IEEE 754 standard representation of the floating point value. These bytes are in network (high byte first) order.

2.3.5   CONSTANT_Long and CONSTANT_Double
CONSTANT_Long andCONSTANT_Double represent eight-byte constants.
```
CONSTANT_Long_info {
        u1 tag;
        u4 high_bytes;
        u4 low_bytes;
}
CONSTANT_Double_info {
        u1 tag;
        u4 high_bytes;
        u4 low_bytes;
}
```
All eight-byte constants take up two spots in the constant pool. If this is the nth item in the constant pool, then the next item will be numbered n+2.

tag

The tag will have the value CONSTANT_Long or CONSTANT_Double.

high_bytes, low_bytes

For CONSTANT_Long, the 64-bit value is (high_bytes << 32) +low_bytes.

For CONSTANT_Double, the 64-bit value,high_bytes and low_bytes together represent the standard IEEE 754 representation of the double-precision ûoating point number.

Page: 61

2.3.6    CONSTANT_NameAndType
CONSTANT_NameAndType is used to represent a field or method, without indicating which class it belongs to.
```
CONSTANT_NameAndType_info {
    u1 tag;
    u2 name_index;
    u2 signature_index;
}
```
tag
　　　　The tag will have the valueCONSTANT_NameAndType.
name_index
　　　　constant_pool [name_index] is a CONSTANT_Utf8 string giving the name of the field or method.
signature_index
　　　　constant_pool [signature_index] is a CONSTANT_Utf8 string giving the signature of the field or method.

2.3.7    CONSTANT_Utf8 and CONSTANT_Unicode
CONSTANT_Utf8 andCONSTANT_Unicode are used to represent constant string values.

CONSTANT_Utf8 strings are "encoded" so that strings containing only non-null ASCII characters, can be represented using only one byte per character, but characters of up to 16 bits can be represented:

All characters in the range 0x0001 to 0x007F are represented by a single byte:
```
+-+-+-+-+-+-+-+-+
|0|7bits of data|
+-+-+-+-+-+-+-+-+
```

The null character (0x0000) and characters in the range 0x0080 to 0x07FF are represented by a pair of two bytes:
```
+-+-+-+-+-+-+-+-+-++-+-+-+-+-+-+-+-+
|1|1|0| 5 bits  | |1|0| 6 bits   |
+-+-+-+-+-+-+-+-+-++-+-+-+-+-+-+-+-+
```

Characters in the range 0x0800 to 0xFFFF are represented by three bytes:
```
+-+-+-+-+-+-+-+-+-++-+-+-+-+-+-+-+-++-+-+-+-+-+-+-+-+
|1|1|1|0|4 bits | |1|0| 6 bits   | |1|0| 6 bits   |
+-+-+-+-+-+-+-+-+-++-+-+-+-+-+-+-+-++-+-+-+-+-+-+-+-+
```

There are two differences between this format and the "standard" UTF-8 format. First, the null byte (0x00) is encoded in two-byte format rather than one-byte, so that our strings never have embedded nulls. Second, only the one-byte, two-byte, and three-byte formats are used. We do not recognize the longer formats.

Page: 62

```
CONSTANT_Utf8_info {
         u1 tag;
         u2 length;
         u1 bytes[length];
}
CONSTANT_Unicode_info {
         u1 tag;
         u2 length;
         u2 bytes [length];
}
```
tag The tag will have the value CONSTANT_Utf8 or CONSTANT_Unicode.

length

The number of bytes in the string. These strings are not null terminated.

bytes

The actual bytes of the string.

2.4    Fields

The information for each field immediately follows the field_count field in the class file. Each field is described by a variable length field_info structure. The format of this structure is as follows:

```
field_info {
         u2 access_flags;
         u2 name_index;
         u2 signature_index;
         u2 attributes_count;
         attribute_info attributes[attribute_count];
}
``` access_flags

This is a set of sixteen flags used by classes, methods, and fields to describe various properties and how they many be accessed by methods in other classes. See the table "Access Flags" which indicates the meaning of the bits in this field.

The possible fields that can be set for a field are ACC_PUBLIC, ACC_PRIVATE, ACC_PROTECTED, ACC_STATIC, ACC_FINAL, ACC_VOLATILE, and ACC_TRANSIENT.

At most one of ACC_PUBLIC, ACC_PROTECTED, and ACC_PRIVATE can be set for any method.

name_index constant_pool [name_index] is a CONSTANT_Utf8 string which is the name of the field.

signature_index constant_pool [signature_index] is a CONSTANT_Utf8 string which is the signature of the field. See the section "Signatures" for more information on signatures.

attributes_count

Page: 63

This value indicates the number of additional attributes about this field.
attributes
A field can have any number of optional attributes associated with it. Currently, the only field attribute recognized is the "ConstantValue" attribute, which indicates that this field is a static numeric constant, and indicates the constant value of that field.
Any other attributes are skipped.

2.5     Methods
The information for each method immediately follows themethod_count field in the class file. Each method is described by a variable length method_info structure. The structure has the following format:

```
method_info {
    u2 access_flags;
    u2 name_index;
    u2 signature_index;
    u2 attributes_count;
    attribute_info attributes [attribute_count];
}
``` access_flags
This is a set of sixteen flags used by classes, methods, and fields to describe various properties and how they many be accessed by methods in other classes. See the table "Access Flags" which gives the various bits in this field.
The possible fields that can be set for a method are ACC_PUBLIC, ACC_PRIVATE, ACC_PROTECTED, ACC_STATIC, ACC_FINAL, ACC_SYNCHRONIZED, ACC_NATIVE, and ACC_ABSTRACT.
At most one of ACC_PUBLIC, ACC_PROTECTED, and ACC_PRIVATE can be set for any method.
name_index
constant_pool[name_index] is a CONSTANT_Utf8 string giving the name of the method.
signature_index
constant_pool [signature_index] is a CONSTANT_Utf8 string giving the signature of the field. See the section "Signatures" for more information on signatures.
attributes_count
This value indicates the number of additional attributes about this field.
attributes
A field can have any number of optional attributes associated with it. Each attribute has a name, and other additional information. Currently, the only field attributes recognized are the "Code" and "Exceptions" attributes, which describe the bytecodes that are executed to perform this method, and the JAVA Exceptions which are declared to result from the execution of the method, respectively.
Any other attributes are skipped.

Page: 64

2.6 Attributes

Attributes are used at several different places in the class format. All attributes have the following format:

```
GenericAttribute_info {
    u2 attribute_name;
    u4 attribute_length;
    u1 info[attribute_length];
}
```

The attribute_name is a 16-bit index into the class's constant pool; the value of constant_pool [attribute_name] is a CONSTANT_Utf8 string giving the name of the attribute. The field attribute_length indicates the length of the subsequent information in bytes. This length does not include the six bytes of the attribute_name and attribute_length.

In the following text, whenever we allow attributes, we give the name of the attributes that are currently understood. In the future, more attributes will be added. Class file readers are expected to skip over and ignore the information in any attribute they do not understand.

2.6.1 SourceFile

The "SourceFile" attribute has the following format:

```
SourceFile_attribute {
    u2 attribute_name_index;
    u4 attribute_length;
    u2 sourcefile_index;
}
``` attribute_name_index
  constant_pool [attribute_name_index] is the CONSTANT_Utf8 string "SourceFile".
attribute_length
  The length of a SourceFile_attribute must be 2.
sourcefile_index
  constant_pool [sourcefile_index] is a CONSTANT_Utf8 string giving the source file from which this class file was compiled.

2.6.2 ConstantValue

The "ConstantValue" attribute has the following format:

```
ConstantValue_attribute {
    u2 attribute_name_index;
    u4 attribute_length;
    u2 constantvalue_index;
}
``` attribute_name_index
  constant_pool [attribute_name_index] is the CONSTANT_Utf8 string "ConstantValue".
attribute_length Page: 65

The length of a ConstantValue_attribute must be 2.
constantvalue_index
    constant_pool [constantvalue_index] gives the constant value for this field.
    The constant pool entry must be of a type appropriate to the field, as shown by the following table:

long
CONSTANT_Long float
CONSTANT_Float double
CONSTANT_Double int, short, char, byte, boolean
CONSTANT_Integer 2.6.3     Code
The "Code" attribute has the following format:
Code_attribute {
        u2 attribute_name_index;
        u4 attribute_length;
        u2 max_stack;
        u2 max_locals;
        u4 code_length;
        u1 code[code_length];
        u2 exception_table_length;
        {     u2     start_pc;
            u2     end_pc;
            u2     handler_pc;
            u2     catch_type;
        } exception_table[exception_table_length];
        u2 attributes_count;
        attribute_info attributes [attribute_count];
}
attribute_name_index
    constant_pool [attribute_name_index] is the CONSTANT_Utf8 string "Code".
attribute_length
    This field indicates the total length of the "Code" attribute, excluding the initial Page: 66 six bytes.

max_stack

Maximum number of entries on the operand stack that will be used during execution of this method. See the other chapters in this spec for more information on the operand stack.

max_locals

Number of local variable slots used by this method. See the other chapters in this spec for more information on the local variables.

code_length

The number of bytes in the virtual machine code for this method.

code

These are the actual bytes of the virtual machine code that implement the method. When read into memory, if the first byte of code is aligned onto a multiple-of-four boundary the the tableswitch and tablelookup opcode entries will be aligned; see their description for more information on alignment requirements.

exception_table_length

The number of entries in the following exception table.

exception_table

Each entry in the exception table describes one exception handler in the code.

start_pc, end_pc

The two fieldsstart_pc and end_pc indicate the ranges in the code at which the exception handler is active. The values of both fields are offsets from the start of the code.start_pc is inclusive.end_pc is exclusive.

handler_pc

This field indicates the starting address of the exception handler. The value of the field is an offset from the start of the code.

catch_type

If catch_type is nonzero, then constant_pool [catch_type] will be the class of exceptions that this exception handler is designated to catch. This exception handler should only be called if the thrown exception is an instance of the given class.

If catch_type is zero, this exception handler should be called for all exceptions.

attributes_count

This field indicates the number of additional attributes about code. The "Code" attribute can itself have attributes.

attributes

A "Code" attribute can have any number of optional attributes associated with it. Each attribute has a name, and other additional information. Currently, the only code attributes defined are the "LineNumberTable" and "LocalVariableTable," both of which contain debugging information.

2.6.4     Exceptions Table

This table is used by compilers which indicate which Exceptions a method is declared to throw:

Exceptions_attribute {

Page: 67

```
                    u2 attribute_name_index;
                    u4 attribute_length;
                    u2 number_of_exceptions;
                    u2 exception_index_table [number_of_ex-ceptions];
        }
attribute_name_index
        constant_pool [attribute_name_index] will be the CONSTANT_Utf8 string
"Exceptions".
attribute_length
        This field indicates the total length of the Exceptions_attribute, excluding the
initial six bytes.
number_of_exceptions
        This field indicates the number of entries in the following exception index table.
exception_index_table
        Each value in this table is an index into the constant pool. For each table element
(exception_index_table [i] != 0, where 0 <= i <number_of_exceptions), then constant_pool
[exception_index+table [i]] is a Exception that this class is declared to throw.
```

2.6.5        LineNumberTable

This attribute is used by debuggers and the exception handler to determine which part of the virtual machine code corresponds to a given location in the source. The LineNumberTable_attribute has the following format:

```
        LineNumberTable_attribute {
                    u2              attribute_name_index;
                    u4              attribute_length;
                    u2              line_number_table_length;
                  { u2              start_pc;
                    u2                          line_number;
                  }                 line_number_table[line_number_table_length];
        }
attribute_name_index
        constant_pool [attribute_name_index] will be the CONSTANT_Utf8 string
"LineNumberTable".
attribute_length
        This field indicates the total length of the LineNumberTable_attribute, excluding
the initial six bytes.
line_number_table_length
        This field indicates the number of entries in the following line number table.
line_number_table
        Each entry in the line number table indicates that the line number in the source
file changes at a given point in the code.
start_pc
        This field indicates the place in the code at which the code for a new line in the
```

Page: 68 source begins. source_pc <<SHOULD THAT BEstart_pc?>> is an offset from the beginning of the code.
line_number
The line number that begins at the given location in the file.

2.6.6    LocalVariableTable
This attribute is used by debuggers to determine the value of a given local variable during the dynamic execution of a method. The format of the LocalVariableTable_attribute is as follows:

```
LocalVariableTable_attribute {
        u2       attribute_name_index;
        u4       attribute_length;
        u2       local_variable_table_length;
        { u2     start_pc;
          u2     length;
          u2     name_index;
          u2     signature_index;
          u2     slot;
        }        local_variable_table[local_ variable_table_length];
}
``` attribute_name_index
constant_pool [attribute_name_index] will be the CONSTANT_Utf8 string "LocalVariableTable".
attribute_length
This field indicates the total length of the LineNumberTable_attribute, excluding the initial six bytes.
local_variable_table_length
This field indicates the number of entries in the following local variable table.
local_variable_table
Each entry in the local variable table indicates a code range during which a local variable has a value. It also indicates where on the stack the value of that variable can be found.
start_pc, length
The given local variable will have a value at the code between start_pc andstart_pc + length. The two values are both offsets from the beginning of the code.
name_index, signature_index
constant_pool[name_index] and constant_pool [signature_index] are CONSTANT_Utf8 strings giving the name and signature of the local variable.
slot
The given variable will be the slotth local variable in the method's frame.

3.     The Virtual Machine Instruction Set
3.1    Format for the Instructions
JAVA Virtual Machine instructions are represented in this document by an entry of the following form.

Page: 69 instruction name
> Short description of the instruction
> Syntax:

opcode=number operand1 operand2

...

> Stack: ...., value1, value2 P ..., value3
> A longer description that explains the functions of the instruction and indicates any exceptions that might be thrown during execution.
> Each line in the syntax table represents a single 8-bit byte.
> Operations of the JAVA Virtual Machine most often take their operands from the stack and put their results back on the stack. As a convention, the descriptions do not usually mention when the stack is the source or destination of an operation, but will always mention when it is not. For instance, instruction iload has the short description "Load integer from local variable." Implicitly, the integer is loaded onto the stack. Instruction iadd is described as "Integer add"; both its source and destination are the stack.
> Instructions that do not affect the control flow of a computation may be assumed to always advance the virtual machine program counter to the opcode of the following instruction. Only instructions that do affect control flow will explicitly mention the effect they have on the program counter.

3.2   Pushing Constants onto the Stack bipush
> Push one-byte signed integer
> Syntax:

bipush=16 byte1

> Stack: ...=> ..., value
> byte1 is interpreted as a signed 8-bitvalue. This value is expanded to an integer and pushed onto the operand stack.

sipush
> Push two-byte signed integer
> Syntax:

Page: 70 sipush=17 byte1 byte2

Stack: ...=> ..., item
 bytel and byte2 are assembled into a signed 16-bit value. This value is expanded to an integer and pushed onto the operand stack.

ldc1
 Push item from constant pool
 Syntax:
ldc1=18 indexbyte1

Stack: ...=> ..., item
 indexbyte1 is used as an unsigned 8-bit index into the constant pool of the current class. The item at that index is resolved and pushed onto the stack. If a String is being pushed and there isn't enough memory to allocate space for it then an OutOfMemoryError is thrown.
 Note: A String push results in a reference to an object.

ldc2
 Push item from constant pool
 Syntax:
ldc2=19 indexbyte1 indexbyte2

Stack: ...=> ..., item
 indexbyte1 and indexbyte2 are used to construct an unsigned 16-bit index into the constant pool of the current class. The item at that index is resolved and pushed onto the stack. If a String is being pushed and there isn't enough memory to allocate space for it then an OutOfMemoryError is thrown.
 Note: A String push results in a reference to an object.

ldc2w
 Push long or double from constant pool

Page: 71

Syntax:

ldc2w=20 indexbyte1 indexbyte2

Stack: ...=> ..., constant-word1, constant-word2 indexbyte1 and indexbyte2 are used to construct an unsigned 16-bit index into the constant pool of the current class. The two-word constant that index is resolved and pushed onto the stack.

aconst_null

Push null object reference

Syntax:

aconst_null=1

Stack: ...=> ...,null

Push the null object reference onto the stack.

iconst_m1

Push integer constant -1

Syntax:

iconst_m1=2

Stack: ...=> ..., 1

Push the integer -1 onto the stack.

iconst_<n>

Push integer constant

Syntax:

iconst_,<n>

Stack: ...=> ..., <n>

Forms: iconst_0 = 3, iconst_1 = 4, iconst_2 = 5, iconst_3 = 6, iconst_4 = 7, iconst_5 = 8

Push the integer <n> onto the stack.

lconst_<l>

Push long integer constant

Page: 72 lconst_<l>
Syntax:

Stack: ...=> ..., <l>-word1, <l>-word2
Forms: lconst_0 = 9, lconst_1 = 10
Push the long integer <l> onto the stack.

fconst_<f>

Push single float
Syntax:

fconst_<f>

Stack: ...=> ..., <f>
Forms: fconst_0 = 11, fconst_1 = 12, fconst_2 = 13
Push the single-precision floating point number <f> onto the stack.

dconst_<d>

Push double float
Syntax:

dconst_<d>

Stack: ...=> ..., <d>-word1, <d>-word2
Forms: dconst_0 = 14, dconst_1 = 15
Push the double-precision floating point number <d> onto the stack.

3.3    Loading Local Variables Onto the Stack lload

Load integer from local variable
Syntax:

iload=21 vindex

Stack: ...=> ..., value
The value of the local variable at vindex in the current JAVA frame is pushed onto the operand stack.

iload_<n>

Load integer from local variable

Page: 73

Syntax:
iload_<n>

Stack: ...=> ..., value
Forms: iload_0 = 26, iload_1 = 27, iload_2 = 28, iload_3 = 29
The value of the local variable at <n> in the current JAVA frame is pushed onto the operand stack.
This instruction is the same as iload with a vindex of <n>, except that the operand <n> is implicit.

iload

Load long integer from local variable
Syntax:
iload = 22 vindex

Stack: ... => ..., value-word1, value-work2
The value of the local variables at vindex and vindex+1 in the current JAVA frame is pushed onto the operand stack.

lload_<n>

Load long integer from local variable
Syntax:
iload_<n>

Stack: ...=> ..., value-word1, value-word2
Forms: lload_0 = 30, lload_1 = 31, lload_2 = 32, lload_3 = 33
The value of the local variables at <n> and <n>+1 in the current JAVA frame is pushed onto the operand stack.
This instruction is the same as lload with a vindex of <n>, except that the operand <n> is implicit.

fload

Load single float from local variable
Syntax:
fload = 23 vindex

Stack: ...=> ..., value

Page: 74

The value of the local variable at vindex in the current JAVA frame is pushed onto the opera and stack.

fload_<n>
> Load single float from local variable
> Syntax:

fload_<n>

> Stack: ...=> ...,value
> Forms: fload_0 = 34, fload_1 = 35, fload_2 = 36, fload_3 = 37
> The value of the local variable at <n> in the current JAVA frame is pushed onto the operand stack.
> This instruction is the same as fload with a vindex of <n>, except that the operand <n> is implicit.

dload
> Load double float from local variable
> Syntax:

dload = 24 vindex

> Stack: ...=> ..., value-word1, value-word2
> The value of the local variables at vindex and vindex+1 in the current JAVA frame is pushed onto the operand stack.

dload_<n>
> Load double float from local variable
> Syntax:

dload_<n>

> Stack: ...=> ..., value-word1, value-word2
> Forms: dload_0 = 38, dload_1 = 39, dload_2 = 40, dload_3 = 41
> The value of the local variables at <n> and <n>+1 in the current JAVA frame is pushed onto the operand stack.
> This instruction is the same as dload with a vindex of <n>, except that the operand <n> is implicit.

aload
> Load object reference from local variable
> Syntax:

Page: 75 aload = 25 vindex

Stack: ...=> ..., value
The value of the local variable at vindex in the current JAVA frame is pushed onto the operand stack.

aload_<n>
    Load object reference from local variable
    Syntax:
aload_<n>

Stack: ...=> ..., value
Forms: aload_0 = 42, aload_1 = 43, aload_2 = 44, aload_3 = 45
The value of the local variable at <n> in the current JAVA frame is pushed onto the operand stack.
This instruction is the same as aload with a vindex of <n>, except that the operand <n> is implicit.

3.4    Storing Stack Values into Local Variables istore
    Store integer into local vaiable
    Syntax:
istore = 54 vindex

Stack: ..., value => ...
value must be an integer. Local variable vindex in the current JAVA frame is set to value.

istore_<n>
    Store integer into local variable
    Syntax:
istore_<n>

Stack: ..., value => ...

Page: 76

Forms: istore_0 = 59, istore_1 = 60, istore_2 = 61, istore_3 = 62
value must be an integer. Local variable <n> in the current JAVA frame is set to value.
This instruction is the same as istore with a vindex of <n>, except that the operand <n> is implicit.

lstore
Store long integer into local variable
Syntax:
lstore = 55 vindex

Stack: ..., value-word1, value-word2 => ...
value must be a long integer. Local variables vindex+1 in the current JAVA frame are set to value.

lstore_<n>
Store long integer into local variable
Syntax:
lstore_<n>

Stack: ..., value-word1, value-word2 =>
Forms: lstore_0 = 63, lstore_1 = 64, lstore_2 = 65, lstore_3 = 66
value must be a long integer. Local variables <n> and <n>+1 in the current JAVA frame are set to value.
This instruction is the same as lstore with a vindex of <n>, except that the operand <n> is implicit.

fstore
Store single float into local variable
Syntax:
fstore =56 vindex

Stack: ..., value => ...
value must be a single-precision floating point number. Local variable vindex in the current JAVA frame is set to value.

fstore_<n>

Page: 77

Store single float into local variable
Syntax:
fstore_<n>

Stack: ..., value => ...
Forms: fstore_0 = 67, fstore_1 = 68, fstore_2 = 69, fstore_3 = 70
value must be a single-precision floating point number. Local variable <n> in the current JAVA frame is set to value.
This instruction is the same as fstore with a vindex of <n>, except that the operand <n> is implicit.

dstore
Store double float into local variable
Syntax:
dstore = 57 vindex

Stack: ..., value-word1, value-word2 => ...
value must be a double-precision floating point number. Local variables vindex and vindex+1 in the current JAVA frame are set to value.

dstore_<n>
Store double float into local variable
Syntax:
dstore_<n>

Stack: ..., value-word1, value-word2 => ...
Forms: dstore_0 = 71, dstore_1 = 72, dstore_2 = 73, dstore_3 = 74
value must be a double-precision floating point number. Local variables <n> and <n>+1 in the current JAVA frame are set to value.
This instruction is the same as dstore with a vindex of <n>, except that the operand <n> is implicit.

astore
Store object reference into local variable
Syntax:
astore = 58 vindex

Page: 78

Stack: ..., value => ...
value must be a return address or a reference to an object. Local variable vindex in the current JAVA frame is set to value.

astore_<n>
Store object reference into local variable
Syntax:
astore_<n>

Stack: ..., value => ...
Forms: astore_0 = 75, astore_1 = 76, astore_2 = 77, astore_3 = 78
value must be a return address or a reference to an object. Local variable <n> in the current JAVA frame is set to value.
This instruction is the same as astore with a vindex of <n>, except that the operand <n> is implicit.

iinc
Increment local variable by constant

Syntax:
iinc = 132 vindex const

Stack: no change
Local variable vindex in the current JAVA frame must contain an integer. Its value is incremented by the value const, where const is treated as a signed 8-bit quantity.

3.5  Wider index for Loading, Storing and Incrementing wide
Wider index for accessing local variables in load, store and increment.
Syntax:
wide = 196 vindex2

Stack: no change
This bytecode must precede one of the following bytecodes: iload, lload, fload, Page: 79 dload, aload, istore, lstore, fstore, dstore, astore, iinc. The vindex of the following bytecode and vindex2 from this bytecode are assembled into an unsigned 16-bit index to a local variable in the current JAVA frame. The following bytecode operates as normal except for the use of this wider index.

3.6  Managing Arrays newarray

Allocate new array
    Syntax:
newarray = 188 atype

Stack: ..., size => result
    size must be an integer. It represents the number of elements in the new array.
    atype is an internal code that indicates the type of array to allocate. Possible values for atype are as follows:

| | |
|---|---|
| T_BOOLEAN | 4 |
| T_CHAR | 5 |
| T_FLOAT | 6 |
| T_DOUBLE | 7 |
| T_BYTE | 8 |
| T_SHORT | 9 |
| T_INT | 10 |
| T_LONG | 11 |

A new array of atype, capable of holding size elements, is allocated, and result is a reference to this new object. Allocation of an array large enough to contain size items of atype is attempted. All elements of the array are initialized to zero.

If size is less than zero, a NegativeArraySizeException is thrown. If there is not enough memory to allocate the array, anOutOfMemoryError is thrown.

anewarray

Allocate new array of references to objects
    Syntax:
anewarray = 189 indexbyte1 indexbyte2

Stack: ..., size => result

Page: 80 size must be an integer. It represents the number of elements in the new array.

indexbyte1 and indexbyte2 are used to construct an index into the constant pool of the current class. The item at that index is resolved. The resulting entry must be a class.

A new array of the indicated class type and capable of holding size elements is allocated, and result is a reference to this new object. Allocation of an array large enough to contain size items of the given class type is attempted. All elements of the array are initialized to null.

If size is less than zero, a NegativeArraySizeException is thrown. If there is not enough memory to allocate the array, an OutOfMemoryError is thrown.

anewarray is used to create a single dimension of an array of object references. For example, to create
> new Thread[7]

the following code is used:
> bipush 7
> anewarray <Class "JAVA.lang.Thread"> anewarray can also be used to create the first dimension of a multi-dimensional array. For example, the following array declaration:
> new int[6][]

is created with the following code:
> bipush 6
> anewarray <Class "[I">

See CONSTANT_Class in the "Class File Format" chapter for information on array class names.

multianewarray

Allocate new multi-dimensional array

Syntax:

multianewarray = 197 indexbyte1 indexbyte2 dimensions

Stack: ..., size1 size2...sizen => result

Each size must be an integer. Each represents the number of elements in a dimension of the array.

indexbyte1 and indexbyte2 are used to construct an index into the constant pool of the current class. The item at that index is resolved. The resulting entry must be an array class of one or more dimensions.

dimensions has the following aspects:

It must be an integer 3 1.

Page: 81

It represents the number of dimensions being created. It must be £ the number of dimensions of the array class.

It represents the number of elements that are popped off the stack. All must be integers greater than or equal to zero. These are used as the sizes of the dimension. For example, to create new int[6][3][]

the following code is used:

bipush 6
bipush 3
multianewarray <Class "[[[I"> 2

If any of the size arguments on the stack is less than zero, a NegativeArraySizeException is thrown. If there is not enough memory to allocate the array, an OutOfMemoryError is thrown.

The result is a reference to the new array object.

Note: It is more efficient to use newarray or anewarray when creating a single dimension.

See CONSTANT_Class in the "Class File Format" chapter for information on array class names.

arraylength

Get length of array
Syntax:
arraylength = 190

Stack: ..., objectref => ..., length objectref must be a reference to an array object. The length of the array is determined and replaces objectref on the top of the stack.

If the objectref is null, a NullPointerException is thrown.

iaload

Load integer from array
Syntax:
iaload = 46

Stack: ..., arrayref, index => ..., value arrayref must be a reference to an array of integers. index must be an integer. The integer value at position number index in the array is retrieved and pushed onto the top of the stack.

If arrayref is null a NullPointerException is thrown. If index is not within the bounds of the array an ArrayIndexOutOfBoundsException is thrown.

laload

Page: 82

Load long integer from array
Syntax:
laoad = 47

Stack: ..., arrayref, index => ..., value-word1, value-word2
arrayref must be a reference to an array of long integers. index must be an integer. The long integer value at position number index in the array is retrieved and pushed onto the top of the stack.
If arrayref is null a NullPointerException is thrown. If index is not within the bounds of the array an ArrayIndexOutOfBoundsException is thrown.

faload
Load single float from array
Syntax:
faload = 48

Stack: ..., arrayref, index => ..., value
arrayref must be a reference to an array of single-precision floating point numbers. index must be an integer. The single-precision floating point number value at position number index in the array is retrieved and pushed onto the top of the stack.
If arrayref is null a NullPointerException is thrown. If index is not within the bounds of the array an ArrayIndexOutOfBoundsException is thrown.

daload
Load double float from array
Syntax:
daload = 49

Stack: ..., arrayref, index => ..., value-word1, value-word2
arrayref must be a reference to an array of double-precision floating point numbers. index must be an integer. The double-precision floating point number value at position number index in the array is retrieved and pushed onto the top of the stack.
If arrayref is null a NullPointerException is thrown. If index is not within the bounds of the array an ArrayIndexOutOfBoundsException is thrown.

aaload
Load object reference from array
Syntax:
aaload = 50

Page: 83

Stack: ..., arrayref, index => ..., value
arrayref must be a reference to an array of references to objects. index must be an integer. The object reference at position number index in the array is retrieved and pushed onto the top of the stack.
If arrayref is null a NullPointerException is thrown. If index is not within the bounds of the array an ArrayIndexOutOfBoundsException is thrown.

baload
Load signed byte from array.
Syntax:
baload = 51

Stack: ..., arrayref, index => ..., value
arrayref must be a reference to an array of signed bytes. index must be an integer. The signed byte value at position number index in the array is retrieved, expanded to an integer, and pushed onto the top of the stack.
If arrayref is null a NullPointerException is thrown. If index is not within the bounds of the array an ArrayIndexOutOfBoundsException is thrown.

caload
Load character from array
Syntax:
caload = 52

Stack: ..., arrayref, index => ...,value
arrayref must be a reference to an array of characters. index must be an integer. The character value at position number index in the array is retrieved, zero-extended to an integer, and pushed onto the top of the stack.
If arrayref is null a NullPointerException is thrown. If index is not within the bounds of the array an ArrayIndexOutOfBoundsException is thrown.

saload
Load short from array
Syntax:
saload = 53

Stack: ..., arrayref, index => ..., value
arrayref must be a reference to an array of short integers. index must be an integer. The ;signed short integer value at position number index in the array is retrieved, expanded to an integer, and pushed
onto the top of the stack.

Page: 84

If arrayref is null, a NullPointerException is thrown. If index is not within the bounds of the array an ArrayIndexOutOfBoundsException is thrown.

iastore
    Store into integer array
    Syntax:
iastore = 79

Stack: ..., arrayref, index, value => ...
    arrayref must be a reference to an array of integers, index must be an integer, and value an integer. The integer value is stored at position index in the array.
    If arrayref is null, a NullPointerException is thrown. If index is not within the bounds of the array an ArrayIndexOutOfBoundsException is thrown.

lastore
    Store into long integer array
    Syntax:
lastore = 80

Stack: ..., arrayref, index, value-word1, value-word2 => ...
    arrayref must be a reference to an array of long integers, index must be an integer, and value a long integer. The long integer value is stored at position index in the array.
    If arrayref is null, a NullPointerException is thrown. If index is not within the bounds of the array, an ArrayIndexOutOfBoundsException is thrown.

fastore
    Store into single float array
    Syntax:
fastore = 81

Stack: ..., arrayref, index, value => ...
    arrayref must be an array of single-precision floating point numbers, index must be an integer, and value a single-precision floating point number. The single float value is stored at position index in the array.
    If arrayref is null, a NullPointerException is thrown. If index is not within the bounds of the array an ArrayIndexOutOfBoundsException is thrown.

dastore
    Store into double float array
    Syntax:
dastore = 82

Page: 85

Stack: ..., arrayref, index, value-word1, value-word2 => ...
arrayref must be a reference to an array of double-precision floating point numbers, index must be an integer, and value a double-precision floating point number. The double float value is stored at position index in the array.
If arrayref is null, a NullPointerException is thrown. If index is not within the bounds of the array an ArrayIndexOutOfBoundsException is thrown.

aastore
    Store into object reference array
    Syntax:
aastore = 83

Stack: ..., arrayref, index, value => ...
arrayref must be a reference to an array of references to objects, index must be an integer, and value a reference to an object. The object reference value is stored at position index in the array.
If arrayref is null, a NullPointerException is thrown. If index is not within the bounds of the array, an ArrayIndexOutOfBoundsException is thrown.
The actual type of value must be conformable with the actual type of the elements of the array. For example, it is legal to store an instance of class Thread in an array of class Object, but not vice versa. An ArrayStoreException is thrown if an attempt is made to store an incompatible object reference.

bastore
    Store into signed byte array
    Syntax:
bastore = 84

Stack: ..., arrayref, index, value => ...
arrayref must be a reference to an array of signed bytes, index must be an integer, and value an integer. The integer value is stored at position index in the array. If value is too large to be a signed byte, it is truncated.
If arrayref is null, a NullPointerException is thrown. If index is not within the bounds of the array an ArrayIndexOutOfBoundsException is thrown.

castore
    Store into character array
    Syntax:
castore = 85

Stack: ..., arrayref, index, value => ...

Page: 86 arrayref must be an array of characters, index must be an integer, and value an integer. The integer value is stored at position index in the array. If value is too large to be a character, it is truncated.

If arrayref is null, a NullPointerException is thrown. If index is not within the bounds of [the
array an ArrayIndexOutOfBoundsException is thrown.

sastore

Store into short array
Syntax:

sastore = 86

Stack: ..., array, index, value => ...

arrayref must be an array of shorts, index must be an integer, and value an integer. The integer value is stored at position index in the array. If value is too large to be an short, it is truncated.

If arrayref is null, a NullPointerException is thrown. If index is not within the bounds of the array an ArrayIndexOutOfBoundsException is thrown.

3.7      Stack Instructions nop

Do nothing
Syntax:

nop = 0

Stack: no change
Do nothing.

pop

Pop top stack word
Syntax:

pop = 87

Stack: ..., any => ...
Pop the top word from the stack.

pop2

Pop top two stack words
Syntax:

pop2 = 89

Page: 87

Stack: ..., any2, any1 => ...
Pop the top two words from the stack.

dup

Duplicate top stack word
Syntax:

dup = 89

Stack: ..., any => ..., any,any
Duplicate the top word on the stack.

dup2

Duplicate top two stack words
Syntax:

dup2 = 92

Stack:..., any2,any1 => ..., any2, any1,any2, any1
Duplicate the top two words on the stack.

dup_x1

Duplicate top stack word and put two down
Syntax:

dup_x1 = 90

Stack: ..., any2, any1 =>..., any1, any2, any1
Duplicate the top word on the stack and insert the copy two words down in the stack.

dup2_x1

Duplicate top two stack words and put two down
Syntax:

dup_x1 = 93

Stack: ..., any3, any2, any1 => ..., any2, any1, any3, any2, any1
Duplicate the top two words on the stack and insert the copies two words down in the stack.

dup_x2

Duplicate top stack word and put three down

Page: 88

Syntax:
dup_x2 = 91

Stack: ..., any3, any2, any1 => ..., any1, any3, any2, any1
Duplicate the top word on the stack and insert the copy three words down in the stack.

dup2_x2

Duplicate top two stack words and put three down
Syntax:
dup2_x2 = 94

Stack: ..., any4, any3, any2, any1 => ..., any2, any1, any4, any3, any2, any1
Duplicate the top two words on the stack and insert the copies three words down in the stack.

swap

Swap top two stack words
Syntax:
swap = 95

Stack: ..., any2, any1 => ..., any2, any1
Swap the top two elements on the stack.

3.8      Arithmetic Instructions iadd

Integer add
Syntax:
iadd = 96

Stack: ..., value1, value2 => ..., result
value1 and value 2 must be integers. The values are added and are replaced on the stack by their integer sum.

ladd

Long integer add
Syntax:
ladd = 97

Page: 89

Stack: ..., value1-word1, value1-word2, value2-word1, value2-word2 => ..., result-word1, result-word2 value1 and value 2 must be long integers. The values are added and are replaced on the stack by their long integer sum.

fadd

Single floats add
Syntax:
fadd = 98

Stack: ..., value1, value2 => ..., result value1 and value 2 must be single-precision floating point numbers. The values are added and are replaced on the stack by their single-precision floating point sum.

dadd

Double floats add

Syntax:
dadd = 99

Stack: ..., value1-word1, value1-word2, value2-word1, value2-word2 => ..., result-word1, result-word2 value1 and value 2 must be double-precision floating point numbers. The values are added and are replaced on the stack by their double-precision floating point sum.

isub

Integer subtract
Syntax:
isub = 100

Stack: ..., value1, value2 => ..., result value1 and value 2 must be integers. value2 is subtracted from value1, and both values are replaced on
the stack by their integer difference.

lsub

Long integer subtract
Syntax:
lsub = 101

Page: 90

Stack: ..., value1-word1, value1-word2, value2-word1, value2-word2 => ..., result-word1, result-word2 value1 and value 2 must be long integers. value2 is subtracted from value1, and both values are replaced
on the stack by their long integer difference.

fsub
    Single float subtract
    Syntax:
fsub = 102

Stack: ..., value1, value2 => ..., result value1 and value 2 must be single-precision floating point numbers. value2 is subtracted from value1, and both values are replaced on the stack by their single-precision floating point difference.

dsub
    Double float subtract
    Syntax:
dsub = 103

Stack: ..., value1-word1, value1-word2, value2-word1, value2-word2 => ..., result-word1, result-word2 value1 and value 2 must be double-precision floating point numbers. value2 is subtracted from value1, and both values are replaced on the stack by their double-precision floating point difference.

imul
    Integer multiply
    Syntax:
imul = 104

Stack: ..., value1, value2 => ..., result value1 and value 2 must be integers. Both values are replaced on the stack by their integer product.

lmul
    Long integer multiply
    Syntax:
imul = 105

Page: 91

Stack: ..., value1-word1, value1-word2, value2-word1, value2-word2 => ..., result-word1, result-word2 value1 and value 2 must be long integers. Both values are replaced on the stack by their long integer product.

fmul
    Single float multiply
    Syntax:
fmul = 106

Stack: ..., value1, value2 => ..., result value1 and value 2 must be single-precision floating point numbers. Both values are replaced on the stack by their single-precision floating point product.

dmul
    Double float multiply
    Syntax:
dmul = 107

Stack: ..., value1-word1, value1-word2, value2-word1, value2-word2 => ..., result-word1, result-word2 value1 and value 2 must be double-precision floating point numbers. Both values are replaced on the stack by their double-precision floating point product.

idiv
    Integer divide
    Syntax:
idiv = 108

Stack: ..., value1, value2 => ..., result value1 and value 2 must be integers. value1 is divided by value2, and both values are replaced on the stack by their integer quotient.

The result is truncated to the nearest integer that is between it and 0. An attempt to divide by zero results in a "/ by zero" ArithmeticException being thrown.

ldiv
    Long integer divide
    Syntax:
ldiv = 109

Page: 92

Stack: ..., value1-word1, value1-word2, value2-word1, value2-word2 => ..., result-word1, result-word2 value1 and value 2 must be long integers. value1 is divided by value2, and both values are replaced on the stack by their long integer quotient.

The result is truncated to the nearest integer that is between it and 0. An attempt to divide by zero results in a "/ by zero" ArithmeticException being thrown.

fdiv

Single float divide
    Syntax:

fdiv = 110

Stack: ..., value1, value2 => ..., result value1 and value 2 must be single-precision floating point numbers. value1 is divided by value2, and both values are replaced on the stack by their single-precision floating point quotient.

Divide by zero results in the quotient being NaN.

ddiv

Double float divide
    Syntax:

ddiv = 111

Stack: ..., value1-word1, value1-word2, value2-word1, value2-word2 => ..., result-word1, result-word2 value1 and value 2 must be double-precision floating point numbers. value1 is divided by value2, and both values are replaced on the stack by their double-precision floating point quotient.

Divide by zero results in the quotient being NaN.

irem

Integer remainder
    Syntax:

irem = 112

Stack: ..., value1, value2 => ..., result value1 and value 2 must both be integers. value1 is divided by value2, and both values are replaced on the stack by their integer remainder.

An attempt to divide by zero results in a "/ by zero" ArithmeticException being thrown.

Page: 93 lrem
> Long integer remainder
> Syntax:

lrem = 113

Stack: ..., value1-word1, value1-word2, value2-word1, value2-word2 => ..., result-word1, result-word2 value1 and value 2 must both be long integers. value1 is divided by value2, and both values are replaced on the stack by their long integer remainder.

An attempt to divide by zero results in a "/ by zero" ArithmeticException being thrown.

frem
> Single float remainder
> Syntax:

frem = 114

Stack: ..., value1, value2 => ..., result value1 and value 2 must both be single-precision floating point numbers. value1 is divided by value2, and the quotient is truncated to an integer, and then multiplied by value2. The product is subtracted from value1. The result, as a single-precision floating point number, replaces both values on the stack.

result = value1 - (integral_part(value1/value2) *value2), where integral_part() rounds to the nearest integer, with a tie going to the even number.

An attempt to divide by zero results in NaN.

drem
> Double float remainder
> Syntax:

drem = 115

Stack: ..., value1-word1, value1-word2, value2-word1, value2-word2 => ..., result-word1, result-word2 value1 and value 2 must both be double-precision floating point numbers. value1 is divided by value2, and the quotient is truncated to an integer, and then multiplied by value2. The product is subtracted from value1. The result, as a double-precision floating point number, replaces both values on the stack.

result = value1 - (integral_part(value1/value2) * value2), where integral_part() rounds to the nearest integer, with a tie going to the even number.

An attempt to divide by zero results in NaN.

Page: 94 ineg

Integer negate
    Syntax:

ineg = 116

Stack: ..., value => ..., result
    value must be an integer. It is replaced on the stack by its arithmetic negation.

lneg

Long integer negate
    Syntax:

lneg = 117

Stack: ..., value-word1, value-word2 => ..., result-word1, result-word2
    value must be a long integer. It is replaced on the stack by its arithmetic negation.

fneg

Single float negate
    Syntax:

fneg = 118

Stack: ..., value=> ..., result
    value must be a single-precision floating point number. It is replaced on the stack by its arithmetic
negation.

dneg

Double float negate
    Syntax:

dneg = 119

Stack: ..., value-word1, value-word2 => ..., result-word1, result-word2
    value must be a double-precision floating point number. It is replaced on the
stack by its arithmetic negation.

3.9    Logical Instructions ishl

Integer shift left
    Syntax:

Page: 95 ishl = 120

Stack: ...,value1, value2 => ..., result
    value1 and value 2 must be integers. value1 is shifted left by the amount indicated by the low five bits of value2. The integer result replaces both values on the stack.

ishr
    Integer arithmetic shift right
    Syntax:
ishr = 122

Stack: ..., value1, value2 => ..., result
    value1 and value 2 must be integers. value1 is shifted right arithmetically (with sign extension) by the amount indicated by the low five bits of value2. The integer result replaces both values on the stack.

iushr
    Integer logical shift right
    Syntax:
iushr = 124

Stack: ..., value1, value2 => ..., result
    value1 and value 2 must be integers. value1 is shifted right logically (with no sign extension) by the amount indicated by the low five bits of value2. The integer result replaces both values on the stack.

lshl
    Long integer shift left
    Syntax:
lshl = 121

Stack: ..., value1-word1, value1-word2, value2 => ..., result-word1, result-word2
    value1 must be a long integer and value 2 must be an integer. value1 is shifted left by the amount indicated by the low six bits of value2. The long integer result replaces both values on the stack.

lshr
    Long integer arithmetic shift right
    Syntax:
lshr = 123

Page: 96

Stack: ..., value1-word1, value1-word2, value2 => ..., result-word1, result-word2
value1 must be a long integer and value 2 must be an integer. value1 is shifted right arithmetically (with sign extension) by the amount indicated by the low six bits of value2. The long integer result replaces both values on the stack.

lushr
    Long integer logical shift right
    Syntax:
lushr = 125

Stack: ..., value1-word1, value1-word2, value2-word1, value2-word2 => ..., result-word1, result-word2
value1 must be a long integer and value 2 must be an integer. value1 is shifted right logically (with no sign extension) by the amount indicated by the low six bits of value2. The long integer result replaces both values on the stack.

iand
    Integer boolean AND
    Syntax:
iand = 126

Stack: ..., value1, value2 => ..., result
value1 and value 2 must both be integers. They are replaced on the stack by their bitwise logical and (conjunction).

land
    Long integer boolean AND
    Syntax:
land = 127

Stack: ..., value1-word1, value1-word2, value2-word1, value2-word2 => ..., result-word1, result-word2
value1 and value 2 must both be long integers. They are replaced on the stack by their bitwise logical and (conjunction).

ior
    Integer boolean OR
    Syntax:
ior = 128

Page: 97

Stack: ..., value1, value2 => ..., result
value1 and value 2 must both be integers. They are replaced on the stack by their bitwise logical or (disjunction).

lor
    Long integer boolean OR
    Syntax:
lor = 129

Stack: ..., value1-word1, value1-word2, value2-word1, value2-word2 => ..., result-word1, result-word2
value1 and value 2 must both be long integers. They are replaced on the stack by their bitwise logical or (disjunction).

ixor
    Integer boolean XOR
    Syntax:
ixor = 130

Stack: ..., value1, value2 => ..., result
value1 and value 2 must both be integers. They are replaced on the stack by their bitwise exclusive or (exclusive disjunction).

lxor
    Long integer boolean XOR
    Syntax:
lxor = 131

Stack: ..., value1-word1, value1-word2, value2-word1, value2-word2 => ..., result-word1, result-word2
value1 and value 2 must both be long integers. They are replaced on the stack by their bitwise exclusive or (exclusive disjunction).

3.10 Conversion Operations i2l
    Integer to long integer conversion
    Syntax:
i2l = 133

Page: 98

Stack: ..., value => ..., result-word1, result-word2
value must be an integer. It is converted to a long integer. The result replaces value on the stack.

i2f

Integer to single float
    Syntax:
i2f = 134

Stack: ..., value => ..., result
value must be an integer. It is converted to a single-precision floating point number. The result replaces value on the stack.

i2d

Integer to double float
    Syntax:
i2d = 135

Stack: ..., value => ..., result-word1, result-word2
value must be an integer. It is converted to a double-precision floating point number. The result replaces value on the stack.

l2i

Long integer to integer
    Syntax:
l2i = 136

Stack: ..., value-word1, value-word2 => ..., result
value must be a long integer. It is converted to an integer by taking the low-order 32 bits. The result replaces value on the stack.

l2f

Long integer to single float
    Syntax:
l2f = 137

Stack: ..., value-word1, value-word2 => ..., result
value must be a long integer. It is converted to a single-precision floating point number. The result replaces value on the stack.

Page: 99 l2d
> Long integer to double float
> Syntax:

l2d = 138

Stack: ..., value-word1, value-word2 => ..., result-word1, result-word2
value must be a long integer. It is converted to a double-precision floating point number. The result replaces value on the stack.

f2i
> Single float to integer
> Syntax:

f2i = 139

Stack: ..., value => ..., result
value must be a single-precision floating point number. It is converted to an integer. The result replaces value on the stack.

f2l
> Single float to long integer
> Syntax:

f2l = 140

Stack: ..., value => ..., result-word1, result-word2
value must be a single-precision floating point number. It is converted to a long integer. The result replaces value on the stack.

f2d
> Single float to double float
> Syntax:

f2d = 141

Stack: ..., value => ..., result-word1, result-word2
value must be a single-precision floating point number. It is converted to a double-precision floating point number. The result replaces value on the stack.

d2i
> Double float to integer
> Syntax:

2di = 142

Page: 100

Stack: ..., value-word1, value-word2 => ..., result
value must be a double-precision floating point number. It is converted to an integer. The result replaces value on the stack.

d2l

Double float to long integer
Syntax:
d2l = 143

Stack: ..., value-word1, value-word2 => ..., result-word1, result-word2
value must be a double-precision floating point number. It is converted to a long integer. The result replaces value on the stack.

d2f

Double float to single float
Syntax:
2df = 144

Stack: ..., value-word1, value-word2 => ..., result
value must be a double-precision floating point number. It is converted to a single-precision floating point number. If overflow occurs, the result must be infinity with the same sign as value. The result replaces value on the stack.

int2byte

Integer to signed byte
Syntax:
int2byte = 157

Stack: ..., value => ..., result
value must be an integer. It is truncated to a signed 8-bit result, then sign extended to an integer. The result replaces value on the stack.

int2char

Integer to char
Syntax:
int2char = 146

Stack: ..., value => ..., result
value must be an integer. It is truncated to an unsigned 16-bit result, then zero Page: 101 extended to an integer. The result replaces value on the stack.

int2short
   Integer to short
   Syntax:
int2short = 147

Stack: ..., value => ..., result
   value must be an integer. It is truncated to a signed 16-bit result, then sign extended to an integer. The result replaces value on the stack.

3.11   Control Transfer Instructions ifeq
   Branch if equal to 0
   Syntax:
ifeq = 153 branchbyte1 branchbyte2

Stack: ..., value => ...
   value must be an integer. It is popped from the stack. If value is zero, branchbyte1 and branchbyte2 are used to construct a signed 16-bit offset. Execution proceeds at that offset from the address of this instruction. Otherwise execution proceeds at the instruction following the ifeq.

ifnull
   Branch if null
   Syntax:
ifnull = 198 branchbyte1 branchbyte2

Stack: ..., value => ...
   value must be a reference to an object. It is popped from the stack. If value is null, branchbyte1 and branchbyte2 are used to construct a signed 16-bit offset. Execution proceeds at that offset from the address of this instruction. Otherwise execution proceeds at the Page: 102 instruction following the ifnull.

iflt
>Branch if less than 0
>Syntax:

iflt = 155 branchbyte1 branchbyte2

>Stack: ..., value => ...
>value must be an integer. It is popped from the stack. If value is less than zero, branchbyte1 and branchbyte2 are used to construct a signed 16-bit offset. Execution proceeds at that offset from the address of this instruction. Otherwise execution proceeds at the instruction following the iflt.

ifle
>Branch if less than or equal to 0
>Syntax:

ifle=158 branchbyte1 branchbyte2

>Stack: ..., value => ...
>value must be an integer. It is popped from the stack. If value is less than or equal to zero, branchbyte1 and branchbyte2 are used to construct a signed 16-bit offset. Execution proceeds at that offset from the address of this instruction. Otherwise execution proceeds at the instruction following the ifle.

ifne
>Branch if not equal to 0
>Syntax:

ifne=154 branchbyte1 branchbyte2

Page: 103

Stack: ..., value => ...
value must be an integer. It is popped from the stack. If value is not equal to zero, branchbyte1 and branchbyte2 are used to construct a signed 16-bit offset. Execution proceeds at that offset from the address of this instruction. Otherwise execution proceeds at the instruction following the ifne.

ifnonnull
    Branch if not null

Syntax:
ifnonnull=199 branchbyte1 branchbyte2

Stack: ..., value => ...
value must be a reference to an object. It is popped from the stack. If value is notnull, branchbyte1 and branchbyte2 are used to construct a signed 16-bit offset. Execution proceeds at that offset from the address of this instruction. Otherwise execution proceeds at the instruction following the ifnonnull.

ifgt
    Branch if greater than 0
    Syntax:
ifft=157 branchbyte1 branchbyte2

Stack: ..., value => ...
value must be an integer. It is popped from the stack. If value is greater than zero, branchbyte1 and branchbyte2 are used to construct a signed 16-bit offset. Execution proceeds at that offset from the address of this instruction. Otherwise execution proceeds at the instruction following the ifgt.

ifge
    Branch if greater than or equal to 0
    Syntax:
ifge=156

Page: 104 branchbyte1 branchbyte2

Stack: ..., value => ...
 value must be an integer. It is popped from the stack. If value is greater than or equal to zero, branchbyte1 and branchbyte2 are used to construct a signed 16-bit offset. Execution proceeds at that offset from the address of this instruction. Otherwise execution proceeds at the instruction following instruction ifge.

if_icmpeq
 Branch if integers equal
 Syntax:
if_icmpeq=159 branchbyte1 branchbyte2

Stack: ..., value1, value2 => ...
 value1 and value2 must be integers. They are both popped from the stack. If value1 is equal to value2, branchbyte1 and branchbyte2 are used to construct a signed 16-bit offset. Execution proceeds at that offset from the address of this instruction. Otherwise execution proceeds at the instruction following instruction if_icmpeq.

if_icmpne
 Branch if integers not equal
 Syntax:
if_icmpne=160 branchbyte1 branchbyte2

Stack: ..., value1, value2 => ...
 value1 and value2 must be integers. They are both popped from the stack. If value1 is not equal to value2, branchbyte1 and branchbyte2 are used to construct a signed 16-bit offset. Execution proceeds at that offset from the address of this instruction. Otherwise execution proceeds at the instruction
following instruction if_icmpne.

Page: 105 if_icmplt
Branch if integer less than
Syntax:
if_icmplt=161 branchbyte1 branchbyte2

Stack: ..., value1, value2 => ...
value1 and value2 must be integers. They are both popped from the stack. If value1 is less than value2, branchbyte1 and branchbyte2 are used to construct a signed 16-bit offset. Execution proceeds at that offset from the address of this instruction. Otherwise execution proceeds at the instruction following instruction if_icmplt.

if_icmpgt
Branch if integer greater than
Syntax:
if_icmpgt=163 branchbyte1 branchbyte2

Stack: ..., value1, value2 => ...
value1 and value2 must be integers. They are both popped from the stack. If value1 is greater than value2, branchbyte1 and branchbyte2 are used to construct a signed 16-bit offset. Execution proceeds at that offset from the address of this instruction. Otherwise execution proceeds at the instruction following instruction if_icmpgt.

if_icmple
Branch if integer less than or equal to
Syntax:
if_icmple=164 branchbyte1 branchbyte2

Stack: ..., value1, value2 => ...
value1 and value2 must be integers. They are both popped from the stack. If Page: 106 value1 is less than or equal to value2, branchbyte1 and branchbyte2 are used to construct a signed 16-bit offset. Execution proceeds at that offset from the address of this instruction. Otherwise execution proceeds at the instruction following instruction if_icmple.

if_icmpge

Branch if integer greater than or equal to
Syntax:
if_icmpge=162 branchbyte1 branchbyte2

Stack: ..., value1, value2 => ...

value1 and value2 must be integers. They are both popped from the stack. If value1 is greater than or equal to value2, branchbyte1 and branchbyte2 are used to construct a signed 16-bit offset. Execution
proceeds at that offset from the address of this instruction. Otherwise execution proceeds at the instruction following instruction if_icmpge.

lcmp

Long integer compare
Syntax:
lcmp=148

Stack: ..., value1-word1, value1-word2, value2-word1, value2-word1 => ..., result value1 and value2 must be long integers. They are both popped from the stack and compared. If value1 is greater than value2, the integer value1 is pushed onto the stack. If value1 is equal to value2, the value 0 is pushed onto the stack. If value1 is less than value2, the value -1 is pushed onto the stack.

fcmpl

Single float compare ( 1 on NaN)
Syntax:
fcmpl=149

Stack: ..., value1, value2=> ...,result value1 and value2 must be single-precision floating point numbers. They are both popped from the stack and compared. If value1 is greater than value2, the integer value 1 is pushed onto the stack. If value1 is equal to value2, the value 0 is pushed onto the stack. If value1 is less than value2, the value -1 is pushed onto the stack.

If either value1 or value2 is NaN, the value -1 is pushed onto the stack.

Page: 107

1   fcmpg
              Single float compare (1 on NaN)
              Syntax:
    fcmpg=150

5             Stack: ...,value1, value2=> ..., result
              value1 and value2 must be single-precision floating point numbers. They are
    both popped from the stack and compared. If value1 is greater than value2, the integer value 1
    is pushed onto the stack. If
    value1 is equal to value2, the value 0 is pushed onto the stack. If value1 is less than value2, the
    value -1 is pushed onto the stack.
              If either value1 or value2 is NaN, the value 1 is pushed onto the stack.

dcmpl
10            Double float compare (-1 on NaN)
              Syntax:
    dcmpl-151

Stack: ..., value1-word1, value1-word2, value2-word1, value2-word1=> ..., result
              value1 and value2 must be double-precision floating point numbers. They are
    both popped from the stack and compared. If value1 is greater than value2, the integer value 1
    is pushed onto the stack. If value1 is equal to value2, the value 0 is pushed onto the stack. If
15  value1 is less than value2, the value 1 is pushed onto the stack.
              If either value1 or value2 is NaN, the value 1 is pushed onto the stack.

dcmpg
              Double float compare (1 on NaN)
              Syntax:
    dcmpg=152

20
              Stack: ..., value1-word1, value1-word2, value2-word1, value2-word1 => ...,
    result
              value1 and value2 must be double-precision floating point numbers. They are
    both popped from the stack and compared. If value1 is greater than value2, the integer value 1
    is pushed onto the stack. If value1 is equal to value2, the value 0 is pushed onto the stack. If
    value1 is less than value2, the value -1 is pushed onto the stack.
              If either value1 or value2 is NaN, the value 1 is pushed onto the stack.

25  if_acmpeq
              Branch if object references are equal
              Syntax:

Page: 108 if_acmpeq=165 branchbyte1 branchbyte2

Stack: ...,value1,value2 => ...
value1 and value2 must be references to objects. They are both popped from the stack. If the objects referenced are not the same, branchbyte1 and branchbyte2 are used to construct a signed 16-bit offset.
Execution proceeds at that offset from the Address of this instruction. Otherwise execution proceeds at the instruction following the if_acmpeq.

if_acmpne
Branch if object references not equal
Syntax:
if_acmpne=166 branchbyte1 branchbyte2

Stack: ..., value1, value2 => ...
value1 and value2 must be references to objects. They are both popped from the stack. If the objects referenced are not the same, branchbyte1 and branchbyte2 are used to construct a signed 16-bit offset.
Execution proceeds at that offset from the address of this instruction. Otherwise execution proceeds at
the instruction following instruction if_acmpne.

goto
Branch always
Syntax:
goto=167 branchbyte1 branchbyte2

Stack: no change
branchbyte1 and branchbyte2 are used to construct a signed 16-bit offset.

Page: 109

Execution proceeds at that offset from the address of this instruction.

goto_w
    Branch always (wide index)
    Syntax:
goto_w=200 branchbyte1 branchbyte2 branchbyte3 branchbyte4

Stack: no change
    branchbyte1, branchbyte2, branchbyte3, and branchbyte4 are used to construct a signed 32-bit offset.
    Execution proceeds at that offset from the address of this instruction.

jsr
    Jump subroutine
    Syntax:
jsr=168 branchbyte1 branchbyte2

Stack: ...=> ..., return-address
    branchbyte1 and branchbyte2 are used to construct a signed 16-bit offset. The address of the instruction immediately following the jsr is pushed onto the stack. Execution proceeds at the offset from the address of this instruction.

jsr_w
    Jump subroutine (wide index)
    Syntax:
jsr_w=201 branchbyte1 branchbyte2

Page: 110 branchbyte3 branchbyte4

Stack: ...=> ..., return-address
branchbyte1, branchbyte2, branchbyte3, and branchbyte4 are used to construct a signed 32-bit offset. The address of the instruction immediately following the jsr_w is pushed onto the stack. Execution proceeds at the offset from the address of this instruction.

ret
    Return from subroutine
    Syntax:
ret=169 vindex

Stack: no change
Local variable vindex in the current JAVA frame must contain a return address. The contents of the local variable are written into the pc.
Note that jsr pushes the address onto the stack, and ret gets it out of a local variable. This asymmetry is intentional.

ret_w
    Return from subroutine (wide index)
    Syntax:
ret_w=209 vindexbyte1 vindexbyte2

Stack: no change
vindexbyte1 and vindexbyte2 are assembled into an unsigned 16-bit index to a local variable in the current JAVA frame. That local variable must contain a return address. The contents of the local variable
are written into the pc. See the ret instruction for more information.

3.12 Function Return ireturn
    Return integer from function

Page: 111

Syntax:
ireturn=172

Stack: ..., value => [empty]
value must be an integer. The value value is pushed onto the stack of the previous execution environment. Any other values on the operand stack are discarded. The interpreter then returns control to its caller.

lreturn

Return long integer from function
Syntax:
lreturn=173

Stack: ..., value-word1, value-word2 => [empty]
value must be a long integer. The value value is pushed onto the stack of the previous execution environment. Any other values on the operand stack are discarded. The interpreter then returns control to its caller.

freturn

Return single float from function
Syntax:
freturn=174

Stack: ..., value=> [empty]
value must be a single-precision floating point number. The value value is pushed onto the stack of the previous execution environment. Any other values on the operand stack are discarded. The interpreter
then returns control to its caller.

dreturn

Return double float from function
Syntax:
dreturn=175

Stack: ..., value-word1, value-word2 => [empty]
value must be a double-precision floating point number. The value value is pushed onto the stack of the previous execution environment. Any other values on the operand stack are discarded. The interpreter
then returns control to its caller.

areturn

Page: 112

Return object reference from function
Syntax:
areturn=176

Stack: ..., value => [empty]
value must be a reference to an object. The value value is pushed onto the stack of the previous execution environment. Any other values on the operand stack are discarded. The interpreter then returns control to its caller.

return
Return (void) from procedure
Syntax:
return=177

Stack: ...=> [empty]
All values on the operand stack are discarded. The interpreter then returns control to its caller.

breakpoint
Stop and pass control to breakpoint handler
Syntax:
breakpoint=202

Stack: no change 3.13    Table Jumping tableswitch
Access jump table by index and jump
Syntax:
tableswitch=170

...0-3 byte pad...

default-offset1 default-offset2 default-offset3 default-offset4

Page: 113

1 low1 low2 low3 low4
5 high1 high2 high3

10 high4

...jump offsets...

Stack: ..., index=> ...
  tableswitch is a variable length instruction. Immediately after the tableswitch opcode, between zero and three 0's are inserted as padding so that the next byte begins at an address that is a multiple of four. After the padding follow a series of signed 4-byte quantities:
15 default-offset, low, high, and then high-low+1 further signed 4-byte offsets. The high-low+1 signed 4-byte offsets are treated as a 0-based jump table.
  The index must be an integer. If index is less than low or index is greater than high, then default-offset is added to the address of this instruction. Otherwise, low is subtracted from index, and the index-low'th element of the jump table is extracted, and added to the address of this instruction.

lookupswitch
  Access jump table by key match and jump
20   Syntax:
lookupswitch=171

...0-3 byte pad..

default-offset1 default-offset2
25
default-offset3

Page: 114

```
default-offset4 npairs1 npairs2 npairs3 npairs4

...match-offset pairs...
```

Stack: ..., key=> ...

lookupswitch is a variable length instruction. Immediately after the lookupswitch opcode, between zero and three 0's are inserted as padding so that the next byte begins at an address that is a multiple of four.

Immediately after the padding are a series of pairs of signed 4-byte quantities. The first pair is special. The first item of that pair is the default offset, and the second item of that pair gives the number of pairs that follow. Each subsequent pair consists of a match and an offset.

The key must be an integer. The integer key on the stack is compared against each of the matches. If it is equal to one of them, the offset is added to the address of this instruction. If the key does not match any of the matches, the default offset is added to the address of this instruction.

3.14 Manipulating Object Fields putfield

Set field in object
Syntax:

```
putfield=181 indexbyte1 indexbyte2
```

Stack: ..., objectref, value=> ...
OR
Stack: ..., objectref, value-word1, value-word2=> ...

indexbyte1 and indexbyte2 are used to construct an index into the constant pool

Page: 115 of the current class. The constant pool item will be a field reference to a class name and a field name. The item is resolved to a field block pointer which has both the field width (in bytes) and the field offset (in bytes).

The field at that offset from the start of the object referenced by object refwill be set to the value on the top of the stack.

This instruction deals with both 32-bit and 64-bit wide fields.

If object ref is null, aNullPointerException is generated.

If the specified field is a static field, anIncompatibleClassChangeError is thrown.

getfield
Fetch field from object
Syntax:

getfield=180 indexbyte1 indexbyte2

Stack: ..., objectref=> ...,value
OR
Stack: ..., objectref=> ..., value-word1, value-word2 indexbyte1 and indexbyte2 are used to construct an index into the constant pool of the current class. The constant pool item will be a field reference to a class name and a field name. The item is resolved to a field block pointer which has both the field width (in bytes) and the field offset (in bytes).

objectref must be a reference to an object. The value at offset into the object referenced by objectref replaces objectref on the top of the stack.

This instruction deals with both 32-bit and 64-bit wide fields.

If objectref is null, a NullPointerException is generated.

If the specified field is a static field, an IncompatibleClassChangeError is thrown.

putstatic
Set static field in class
Syntax:

putstatic-179 indexbyte1 indexbyte2

Stack: ..., value=> ...

Page: 116

OR

Stack: ..., value-word1, value-word2=> ...

indexbyte1 and indexbyte2 are used to construct an index into the constant pool of the current class. The constant pool item will be a field reference to a static field of a class. That field will be set to have the value on the top of the stack.

This instruction works for both 32-bit and 64-bit wide fields.

If the specified field is a dynamic field, an IncompatibleClassChangeError is thrown.

getstatic

Get static field from class
Syntax:
getstatic=178 indexbyte1 indexbyte2

Stack: ..., => ..., value

OR

Stack: ..., => ..., value-word1, value-word2 indexbyte1 and indexbyte2 are used to construct an index into the constant pool of the current class. The constant pool item will be a field reference to a static field of a class.

This instruction deals with both 32-bit and 64-bit wide fields.

If the specified field is a dynamic field, an IncompatibleClassChangeError is generated.

3.15    Method Invocation

There are four instructions that implement method invocation.

invokevirtual    Invoke an instance method of an object, dispatching based on the runtime (virtual) type of the object. This is the normal method dispatch in JAVA.

invokenonvirtualInvoke an instance method of an object, dispatching based on the compile-time (non-virtual) type of the object. This is used, for example, when the keywordsuper or the name of a superclass is used as a method qualifier.

invokestatic    Invoke a class (static) method in a named class.

invokeinterfaceInvoke a method which is implemented by an interface, searching the methods implemented by the particular run-time object to find the appropriate method.

invokevirtual

Invoke instance method, dispatch based on run-time type
Syntax:
invokevirtual=182

Page: 117 indexbyte1 indexbyte2

Stack: ..., objectref, [arg1, [arg2 ...]], ...=> ...
The operand stack must contain a reference to an object and some number of arguments.indexbyte1 and indexbyte2 are used to construct an index into the constant pool of the current class. The item at that index in the constant pool contains the complete method signature. A pointer to the object's method table is retrieved from the object reference. The method signature is looked up in the method table. The method signature is guaranteed to exactly match one of the method signatures in the table.

The result of the lookup is an index into the method table of the named class, which is used with the object's dynamic type to look in the method table of that type, where a pointer to the method block for the matched method is found. The method block indicates the type of method (native, synchronized, and so on) and the number of arguments expected on the operand stack.

If the method is marked synchronized the monitor associated with objectref is entered.

The objectref and arguments are popped off this method's stack and become the initial values of the local variables of the new method. Execution continues with the first instruction of the new method.

If the object reference on the operand stack is null, a NullPointerException is thrown. If during the method invocation a stack overflow is detected, a StackOverflowError is thrown.

invokenonvirtual
Invoke instance method, dispatching based on compile-time type
Syntax:
invokenonvirtual = 183 indexbyte1 indexbyte2

Stack: ..., objectref, [arg1, [arg2 ...]], ... => ...
The operand stack must contain a reference to an object and some number of arguments.indexbyte1 and indexbyte2 are used to construct an index into the constant pool of the current class. The item at that index in the constant pool contains a complete method signature and class. The method signature is looked up in the method table of the class indicated. The method signature is guaranteed to exactly match one of the method signatures in the table.

Page: 118

The result of the lookup is a method block. The method block indicates the type of method (native, synchronized, and so on) and the number of arguments (nargs) expected on the operand stack.

If the method is marked synchronized the monitor associated with objectref is entered.

The objectref and arguments are popped off this method's stack and become the initial values of the local variables of the new method. Execution continues with the first instruction of the new method.

If the object reference on the operand stack is null, a NullPointerException is thrown. If during the method invocation a stack overflow is detected, a StackOverflowError is thrown.

invokestatic
    Invoke a class (static) method
    Syntax:
invokestatis = 184 indexbyte1 indexbyte2

Stack: ..., [arg1, [arg2 ...]], ... => ...

The operand stack must contain some number of arguments.indexbyte1 and indexbyte2 are used to construct an index into the constant pool of the current class. The item at that index in the constant pool contains the complete method signature and class. The method signature is looked up in the method table of the class indicated. The method signature is guaranteed to exactly match one of the method signatures in the class's method table.

The result of the lookup is a method block. The method block indicates the type of method (native, synchronized, and so on) and the number of arguments (nargs) expected on the operand stack.

If the method is marked synchronized the monitor associated with the class is entered.

The arguments are popped off this method's stack and become the initial values of the local variables
of the new method. Execution continues with the first instruction of the new method.

If during the method invocation a stack overflow is detected, a StackOverflowError is thrown.

invokeinterface
    Invoke interface method
    Syntax:
invokeinterface = 185

Page: 119 indexbyte1 indexbyte2 nargs reserved

Stack: ..., objectref, [arg1, [arg2 ...]], ... => ...

The operand stack must contain a reference to an object and nargs-1 arguments. indexbyte1 and indexbyte2 are used to construct an index into the constant pool of the current class. The item at that index in the constant pool contains the complete method signature. A pointer to the object's method table is retrieved from the object reference. The method signature is looked up in the method table. The method signature is guaranteed to exactly match one of the method signatures in the table.

The result of the lookup is a method block. The method block indicates the type of method (native, synchronized, and so on) but unlike invokevirtual and invokenonvirtual, the number of available arguments (nargs) is taken from the bytecode.

If the method is markedsynchronized the monitor associated with objectref is entered.

The objectref and arguments are popped off this method's stack and become the initial values of the local variables of the new method. Execution continues with the first instruction of the new method.

If the objectref on the operand stack is null, a NullPointerException is thrown. If during the method invocation a stack overflow is detected, a StackOverflowError is thrown.

3.16    Exception Handling athrow

Throw exception or error
    Syntax:

athrow = 191

Stack: ..., objectref => [undefined]

objectref must be a reference to an object which is a subclass of Throwable, which is thrown. The current JAVA stack frame is searched for the most recent catch clause that catches this class or a superclass of this class. If a matching catch list entry is found, the pc is reset to the address indicated by the catch-list entry, and execution continues there.

If no appropriate catch clause is found in the current stack frame, that frame is popped and the object is rethrown. If one is found, it contains the location of the code for this exception. The pc is reset to that location and execution continues. If no appropriate catch is found in the current stack frame, that frame is popped and the objectref is rethrown.

Page: 120

If objectref is null, then a NullPointerException is thrown instead.

3.17 Miscellaneous Object Operations new

Create new object
    Syntax:

new = 187 indexbyte1 indexbyte2

Stack: ... => ..., objectref indexbyte1 and indexbyte2 are used to construct an index into the constant pool of the current class. The item at that index must be a class name that can be resolved to a class pointer, class. A new instance of that class is then created and a reference to the object is pushed on the stack.

checkcast

Make sure object is of given type
    Syntax:

checkcast = 192 indexbyte1 indexbyte2

Stack: ..., objectref => ..., objectref indexbyte1 and indexbyte2 are used to construct an index into the constant pool of the current class. The string at that index of the constant pool is presumed to be a class name which can be resolved to a class pointer, class. objectref must be a reference to an object.

checkcast determines whether objectref can be cast to be a reference to an object of class class. A null objectref can be cast to any class. Otherwise the referenced object must be an instance of class or one of its superclasses. If objectref can be cast to class execution proceeds at the next instruction, and the objectref remains on the stack.

If objectref cannot be cast to class, a ClassCastException is thrown.

instanceof

Determine if an object is of given type
    Syntax:

instanceof = 193

Page: 121 indexbyte1 indexbyte2

Stack: ..., objectref => ..., result indexbyte1 and indexbyte2 are used to construct an index into the constant pool of the current class. The string at that index of the constant pool is presumed to be a class name which can be resolved to a class
pointer, class. objectref must be a reference to an object.

instanceof determines whether objectref can be cast to be a reference to an object of the class class. This instruction will overwrite objectref with 1 if objectref is an instance of class or one of its superclasses. Otherwise, objectref is overwritten by 0. If objectref is null, it's overwritten by 0.

3.18 Monitors monitorenter
    Enter monitored region of code
    Syntax:
monitorenter = 194

Stack: ..., objectref => ...

objectref must be a reference to an object.

The interpreter attempts to obtain exclusive access via a lock mechanism to objectref. If another thread already has objectref locked, than the current thread waits until the object is unlocked. If the current thread already has the object locked, then continue execution. If the object is not locked, then obtain an exclusive lock.

If objectref is null, then a NullPointerException is thrown instead.

monitorexit
    Exit monitored region of code
    Syntax:
monitorexit = 195

Stack: ..., objectref => ...

objectref must be a reference to an object. The lock on the object released. If this is the last lock that this thread has on that object (one thread is allowed to have multiple locks on a single object), then other threads that are waiting for the object to be available are allowed to proceed.

If objectref is null, then a NullPointerException is thrown instead.

Page: 122

Appendix A: An Optimization

The following set of pseudo-instructions suffixed by _quick are variants of JAVA virtual machine instructions. They are used to improve the speed of interpreting bytecodes. They are not part of the virtual machine specification or instruction set, and are invisible outside of an JAVA virtual machine implementation. However, inside a virtual machine implementation they have proven to be an effective optimization.

A compiler from JAVA source code to the JAVA virtual machine instruction set emits only non-_quick instructions. If the _quick pseudo-instructions are used, each instance of a non-_quick instruction with a _quick variant is overwritten on execution by its_quick variant. Subsequent execution of that instruction instance will be of the_quick variant.

In all cases, if an instruction has an alternative version with the suffix_quick, the instruction references the constant pool. If the_quick optimization is used, each non-_quick instruction with a_quick variant performs the following:

Resolves the specified item in the constant pool;
Signals an error if the item in the constant pool could not be resolved for some reason;
Turns itself into the _quick version of the instruction. The instructions putstatic, getstatic, putfield, and getfield each have two _quick versions; and
Performs its intended operation.

This is identical to the action of the instruction without the _quick optimization, except for the additional step in which the instruction overwrites itself with its _quick variant.

The _quick variant of an instruction assumes that the item in the constant pool has already been resolved, and that this resolution did not generate any errors. It simply performs the intended operation on the resolved item.

Note: some of the invoke methods only support a single-byte offset into the method table of the object; for objects with 256 or more methods some invocations cannot be "quicked" with only these bytecodes.

This Appendix doesn't give the opcode values of the pseudo-instructions, since they are invisible and subject to change.

A.1     Constant Pool Resolution

When the class is read in, an array constant_pool [] of size n constants is created and assigned to a field in the class.constant_pool [0] is set to point to a dynamically allocated array which indicates which fields in the constant_pool have already been resolved.constant_pool [1] through constant_pool [nconstants - 1] are set to point at the "type" field that corresponds to this constant item.

When an instruction is executed that references the constant pool, an index is generated, and constant_pool[0] is checked to see if the index has already been resolved. If so, the value of constant_pool [index] is returned. If not, the value of constant_pool [index] is resolved to be the actual pointer or data, and overwrites whatever value was already in constant_pool [index].

Page: 123

A.2    Pushing Constants onto the Stack (_quick variants)

ldc1_quick
    Push item from constant pool onto stack
    Syntax:
ldc1_quick indexbyte1

Stack: ...=>...,item
indexbyte1 is used as an unsigned 8-bit index into the constant pool of the current class. The item at that index is pushed onto the stack.

ldc2_quick
    Push item from constant pool onto stack
    Syntax:
ldc2_quick indexbyte1 indexbyte2

Stack: ...=>...,item
indexbyte1 and indexbyte2 are used to construct an index into the constant pool of the current class. The constant at that index is resolved and the item at that index is pushed onto the stack.

ldc2w_quick
    Push long integer or double float from constant pool onto stack
    Syntax:
ldc2w_quick indexbyte1 indexbyte2

Stack: ...=>...,constant-word1,constant-word2
indexbyte1 and indexbyte2 are used to construct an index into the constant pool of the current class. The constant at that index is pushed onto the stack.

A.3    Managing Arrays (_quick variants)

Page: 124

1 anewarray_quick
Allocate new array of references to objects
Syntax:
anewarray_quick indexbyte1

5 indexbyte2

Stack: ...,size=>result
size must be an integer. It represents the number of elements in the new array.
indexbyte1 and indexbyte2 are are used to construct an index into the constant pool of the current class. The entry must be a class.
A new array of the indicated class type and capable of holding size elements is
10 allocated, and result is a reference to this new array. Allocation of an array large enough to contain size items of the given class type is attempted. All elements of the array are initialized to zero.
If size is less than zero, a NegativeArraySizeException is thrown. If there is not enough memory to allocate the array, an OutOfMemoryError is thrown.

multianewarray_quick
Allocate new multi-dimensional array
Syntax:
15 multianewarray_quick indexbyte1 indexbyte2 dimensions

20
Stack: ...,size1,size2,...sizen=>result
Each size must be an integer. Each represents the number of elements in a dimension of the array.
indexbyte1 and indexbyte2 are used to construct an index into the constant pool of the current class. The resulting entry must be a class.
dimensions has the following aspects:
It must be an integer 31.
It represents the number of dimensions being created. It must be £
25 the number of dimensions of the array class.
It represents the number of elements that are popped off the stack.
All must be integers greater than or equal to zero. These are used as the sizes of the dimension.

Page: 125

If any of the size arguments on the stack is less than zero, a NegativeArraySizeException is thrown. If there is not enough memory to allocate the array, an OutOfMemoryError is thrown.

The result is a reference to the new array object.

A.4     Manipulating Object Fields (_quick variants)

putfield_quick
    Set field in object
    Syntax:
putfield2_quick offset unused Stack: ...,objectref,value=>...

objectref must be a reference to an object. value must be a value of a type appropriate for the specified field. offset is the offset for the field in that object. value is written at offset into the object. Both objectref and value are popped from the stack.

If objectref is null, a NullPointerException is generated.

putfield2_quick
    Set long integer or double float field in object
    Syntax:
putfield2_quick offset unused Stack: ...,objectref,value-word1,value-word2=>...

objectref must be a reference to an object. value must be a value of a type appropriate for the specified field. offset is the offset for the field in that object. value is written at offset into the object. Both objectref and value are popped from the stack.

If objectref is null, a NullPointerException is generated.

getfield_quick
    Fetch field from object
    Syntax:
getfield2_quick

Page: 126 offset unused

Stack: ...,objectref=>...,value
objectref must be a handle to an object. The value at offset into the object referenced by objectref replaces objectref on the top of the stack.
If objectref is null, a NullPointerException is generated.

getfield2_quick
    Fetch field from object
    Syntax:
getfield2_quick offset unused Stack: ...,objectref=>...,value-word1,value-word2
objectref must be a handle to an object. The value at offset into the object referenced by objectref replaces objectref on the top of the stack.
If objectref is null, a NullPointerException is generated.

putstatic_quick
    Set static field in class
    Syntax:
putstatic_quick indexbyte1 indexbyte2

Stack: ...,value=>...
indexbyte1 and indexbyte2 are used to construct an index into the constant pool of the current class. The constant pool item will be a field reference to a static field of a class.value must be the type appropriate to that field. That field will be set to have the value value.

putstatic2_quick
    Set static field in class
    Syntax:
putstatic2_quick

Page: 127 indexbyte1 indexbyte2

Stack: ...,value-word1,value-word2=>...

indexbyte1 and indexbyte2 are used to construct an index into the constant pool of the current class. The constant pool item will be a field reference to a static field of a class. That field must either be a long integer or a double precision floating point number. value must be the type appropriate to that field. That field will be set to have the value value.

getstatic_quick
    Get static field from class
    Syntax:
getstatic_quick indexbyte1 indexbyte2

Stack: ...,=>...,value indexbyte1 and indexbyte2 are used to construct an index into the constant pool of the current class. The constant pool item will be a field reference to a static field of a class. The value of that field will replace handle on the stack.

getstatic2_quick
    Get static field from class
    Syntax:
getstatic2_quick indexbyte1 indexbyte2

Stack: ...,=>...,value-word1,value-word2 indexbyte1 and indexbyte2 are used to construct an index into the constant pool of the current class. The constant pool item will be a field reference to a static field of a class. The field must be a long integer or a double precision floating point number. The value of that field will replace handle on the stack A.5    Method Invocation (_quick variants)

Page: 128 invokevirtual_quick
> Invoke instance method, dispatching based on run-time type
> Syntax:

invokevirtual_quick offset nargs

> Stack: ...,objectref,[arg1,[arg2...]]=>...
> The operand stack must contain objectref, a reference to an object and nargs-1 arguments. The method block at offset in the object's method table, as determined by the object's dynamic type, is retrieved. The method block indicates the type of method (native, synchronized, etc.).
> If the method is marked synchronized the monitor associated with the object is entered.
> The base of the local variables array for the new JAVA stack frame is set to point to objectref on the stack, making objectref and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.
> If objectref is null, a NullPointerException is thrown. If during the method invocation a stack overflow is detected, a StackOverflowError is thrown.

invokevirtualobject_quick
> Invoke instance method of class JAVA.lang.Object, specifically for benefit of arrays
> Syntax:

invokevirtualobject_quick offset nargs

> Stack: ...,objectref,[arg1,[arg2...]]=>...
> The operand stack must contain objectref, a reference to an object or to an array and nargs-1 arguments. The method block at offset in JAVA.lang.Object's method table is retrieved. The method block indicates the type of method (native, synchronized, etc.).
> If the method is marked synchronized the monitor associated with handle is entered.

Page: 129

The base of the local variables array for the new JAVA stack frame is set to point to objectref on the stack, making objectref and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokenonvirtual_quick
    Invoke instance method, dispatching based on compile-time type
    Syntax:
invokenonvirtual_quick indexbyte1 indexbyte2

Stack: ...,objectref,[arg1,[arg2...]]=>...

The operand stack must contain objectref, a reference to an object and some number of arguments. indexbyte1 and indexbyte2 are used to construct an index into the constant pool of the current class. The item at that index in the constant pool contains a method slot index and a pointer to a class. The method block at the method slot index in the indicated class is retrieved. The method block indicates the type of method (native, synchronized, etc.) and the number of arguments (nargs) expected on the operand stack.

If the method is marked synchronized the monitor associated with the object is entered.

The base of the local variables array for the new JAVA stack frame is set to point to objectref on the stack, making objectref and the supplied arguments (arg1, arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokestatic_quick
    Invoke a class (static) method
    Syntax:
invokestatic_quick Page: 130 indexbyte1 indexbyte2

Stack: ...,[arg1,[arg2...]]=>...
The operand stack must contain some number of arguments. indexbyte1 and indexbyte2 are used to construct an index into the constant pool of the current class. The item at that index in the constant pool contains a method slot index and a pointer to a class. The method block at the method slot index in the indicated class is retrieved. The method block indicates the type of method (native, synchronized, etc.) and the number of arguments (nargs) expected on the operand stack.

If the method is marked synchronized the monitor associated with the method's class is entered.

The base of the local variables array for the new JAVA stack frame is set to point to the first argument on the stack, making the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If the object handle on the operand stack is null, a NullPointerException is thrown. If during the method invocation a stack overflow is detected, a StackOverflowError is thrown.

invokeinterface_quick
    Invoke interface method
    Syntax:
invokeinterface_quick idbyte1 idbyte2 nargs guess

Stack: ...,objectref,[arg1,[arg2...]]=>...
The operand stack must contain objectref, a reference to an object, and nargs-1 arguments. idbyte1 and idbyte2 are used to construct an index into the constant pool of the current class. The item at that index in the constant pool contains the complete method signature. A pointer to the object's method table is retrieved from the object handle.

Page: 131

The method signature is searched for in the object's method table. As a short-cut, the method signature at slot guess is searched first. If that fails, a complete search of the method table is performed. The method signature is guaranteed to exactly match one of the method signatures in the table.

The result of the lookup is a method block. The method block indicates the type of method (native, synchronized, etc.) but the number of available arguments (nargs) is taken from the bytecode.

If the method is marked synchronized the monitor associated with handle is entered.

The base of the local variables array for the new JAVA stack frame is set to point to handle on the stack, making handle and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

guess is the last guess. Each time through, guess is set to the method offset that was used.

A.6     Miscellaneous Object Operations (_quick variants)

new_quick
    Create new object
    Syntax:
new_quick indexbyte1 indexbyte2

Stack: ...=>...,objectref indexbyte1 and indexbyte2 are used to construct an index into the constant pool of the current class. The item at that index must be a class. A new instance of that class is then created and objectref, a reference to that object is pushed on the stack.

checkcast_quick
    Make sure object is of given type
    Syntax:
checkcast_quick indexbyte1

Page: 132 indexbyte2

Stack: ...,objectref=>...,objectref objectref must be a reference to an object. indexbyte1 and indexbyte2 are used to construct an index into the constant pool of the current class. The object at that index of the constant pool must have already been resolved.

checkcast then determines whether objectref can be cast to a reference to an object of class class. A null reference can be cast to any class, and otherwise the superclasses of objectref's type are searched for class. If class is determined to be a superclass of objectref's type, or if objectref is null, it can be cast to objectref cannot be cast to class, a ClassCastException is thrown.

instanceof_quick
    Determine if object is of given type
    Syntax:
instanceof_quick indexbyte1 indexbyte2

Stack: ...,objectref=>...,result objectref must be a reference to an object. indexbyte1 and indexbyte2 are used to construct an index into the constant pool of the current class. The item of class class at that index of the constant pool must have already been resolved.

Instance of determines whether objectref can be cast to an object of the class class. A null objectref can be cast to any class, and otherwise the superclasses of objectref's type are searched for class. If class is determined to be a superclass of objectref's type, result is 1 (true). Otherwise, result is 0 (false). If handle is null, result is 0 (false).

What is claimed is:

1. A distributed data processing system having a host computer coupled by way of a network to one or more peripheral devices, the system comprising:
- a peripheral device database coupled to the network, and containing information concerning a profile of the capabilities for each of the one or more peripheral devices coupled to the network;
- a host computer comprising:
  - a first network interface coupled to the network and suitable for bi-directional transmission of data between the host computer and the network;
  - a first virtual machine instruction processor capable of executing one or more virtual machine instructions;
  - a storage device coupled to the first virtual machine instruction processor;
  - an application having one or more virtual machine instructions stored in the storage device;
  - a determination mechanism embedded in the application stored on the storage device which queries the peripheral device database based upon a predetermined criteria and selects which peripheral device should execute at least a portion of the application wherein said at least a portion of the application includes at least one virtual machine instruction; and
  - a download mechanism coupled to the first network interface capable of transferring an application to one of the peripheral devices for execution; and
- a peripheral device comprising:
  - a second network interface coupled to the network and suitable for bi-directional transmission of data between the peripheral device and the network; and
  - a second virtual machine instruction processor coupled to the second network interface and capable of executing one or more virtual machine instructions wherein following receipt from said host computer of said least a portion of said application including at least one virtual machine instruction for said peripheral device, said virtual machine instruction processor executes said at least a portion of the application including said one virtual machine instruction.

2. The distributed data processing system of claim 1 wherein the one or more peripheral devices included in the peripheral device database includes printer devices.

3. The distributed data processing system of claim 1 wherein the one or more peripheral devices included in the peripheral device database includes image capture devices.

4. The distributed data processing system of claim 1 wherein the one or more peripheral devices included in the peripheral device database includes telecommunication devices.

5. The distributed data processing system of claim 1 wherein the one or more peripheral devices included in the peripheral device database includes display devices.

6. The distributed data processing system of claim 1 wherein the one or more peripheral devices included in the peripheral device database includes sound generation devices.

7. The distributed data processing system of claim 1 wherein the one or more peripheral devices included in the peripheral device database includes facsimile devices.

8. The distributed data processing system of claim 1 wherein the virtual machine instruction processor is based upon the Java virtual machine.

9. The distributed data processing system of claim 1 wherein the predetermined criteria used to select the peripheral device includes specific features of the peripheral device relating to cost, processing speed, quality, performance, capabilities, and geographic proximity to the host computer.

10. A method of distributing the processing of an application between a host computer and one or more peripheral devices coupled to a network, the method comprising:
- collecting information concerning the capabilities of each of the one or more peripheral devices coupled to the network;
- executing an application comprising one or more virtual instructions on a host computer having a first virtual machine instruction processor wherein the application has a predetermined criteria for one or more peripheral devices;
- querying the collected information concerning the capabilities for each of the one or more peripheral devices using the predetermined criteria for one or more peripheral devices;
- selecting which peripheral device should execute at least a portion of the application based on information obtained in response to the query wherein said at least a portion of the application includes at least one virtual machine instruction;
- transferring said at least a portion of the application to the peripheral device selected for executing the application;
- establishing a bi-directional communication between the selected peripheral device and the host computer for transmitting and receiving real-time information associated with the peripheral device and the host computer; and
- executing the at least a portion of the application on a second virtual machine instruction processor coupled to the selected peripheral device.

11. The method of claim 10 wherein the peripheral device is a printer device.

12. The method of claim 10 wherein the peripheral device is an image capture device.

13. The method of claim 10 wherein the peripheral device is a telecommunication device.

14. The method of claim 10 wherein the peripheral device is a display device.

15. The method of claim 10 wherein the peripheral device is a sound generation device.

16. The method of claim 10 wherein the peripheral device is a facsimile device.

17. The method of claim 10 wherein the virtual machine instruction processor is based upon the Java virtual machine.

18. The method of claim 10 wherein the predetermined criteria used to select the peripheral device includes specific features of the peripheral device relating to cost, processing speed, quality, performance, capabilities, and geographic proximity to the host computer.

* * * * *